United States Patent
Takeuchi et al.

(10) Patent No.: US 9,164,951 B2
(45) Date of Patent: Oct. 20, 2015

(54) MULTIPROCESSOR SYSTEM, EXECUTION CONTROL METHOD AND EXECUTION CONTROL PROGRAM

(75) Inventors: Toshiki Takeuchi, Tokyo (JP); Hiroyuki Igura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 506 days.

(21) Appl. No.: 13/637,776

(22) PCT Filed: May 24, 2011

(86) PCT No.: PCT/JP2011/061812
§ 371 (c)(1),
(2), (4) Date: Nov. 28, 2012

(87) PCT Pub. No.: WO2011/148920
PCT Pub. Date: Dec. 1, 2011

(65) Prior Publication Data
US 2013/0067201 A1    Mar. 14, 2013

(30) Foreign Application Priority Data

May 26, 2010  (JP) ................................ 2010-120241

(51) Int. Cl.
*G06F 15/173*  (2006.01)
(52) U.S. Cl.
CPC ............................... *G06F 15/17337* (2013.01)
(58) Field of Classification Search
None
See application file for complete search history.

(56) References Cited

U.S. PATENT DOCUMENTS

| | | | |
|---|---|---|---|
| 5,592,664 A * | 1/1997 | Starkey | 1/1 |
| 8,583,845 B2 * | 11/2013 | Takeuchi et al. | 710/240 |
| 2002/0066005 A1 | 5/2002 | Shibayama et al. | |
| 2003/0110329 A1 | 6/2003 | Higaki et al. | |
| 2006/0005097 A1 * | 1/2006 | Ichikawa et al. | 714/745 |
| 2007/0174493 A1 | 7/2007 | Irish et al. | |

(Continued)

FOREIGN PATENT DOCUMENTS

| | | |
|---|---|---|
| JP | H02273848 A | 11/1990 |
| JP | H09218859 A | 8/1997 |

(Continued)

OTHER PUBLICATIONS

Japanese Office Action for JP Application No. 2012-517266 mailed on Dec. 2, 2014 with partial English Translation.

(Continued)

*Primary Examiner* — Kris Rhu
(74) *Attorney, Agent, or Firm* — Sughrue Mion, PLLC

(57) ABSTRACT

The multiprocessor system includes one or a plurality of main processors and a plurality of sub-processors, and an execution control circuit which conducts execution control of each the sub-processors, wherein the execution control circuit includes an execution control processor for execution control processing of each the sub-processors, a control bus output unit for activation of a command to each the sub-processors, a status bus input unit for status notification from each the sub-processors, a determination circuit which determines whether or not the status notification has one-to-one dependency with a processing command to be issued next on an operation sequence and is to be processed at a high speed, a status accelerator which issues a corresponding processing activation command when the status notification is to be processed at a high speed, and a status FIFO control unit which processes the status notification by using the execution control processor.

11 Claims, 19 Drawing Sheets

(56) References Cited

U.S. PATENT DOCUMENTS

| | | |
|---|---|---|
| 2008/0086617 A1 | 4/2008 | Kasahara et al. |
| 2008/0209168 A1* | 8/2008 | Yokota .......................... 712/30 |
| 2008/0211803 A1* | 9/2008 | Kaneko ........................ 345/418 |
| 2011/0125948 A1 | 5/2011 | Takeuchi et al. |

FOREIGN PATENT DOCUMENTS

| | | |
|---|---|---|
| JP | 2002163105 A | 6/2002 |
| JP | 2002207711 A | 7/2002 |
| JP | 2003208412 A | 7/2003 |
| JP | 2007200295 A | 8/2007 |
| JP | 2007219816 A | 8/2007 |
| JP | 2008097084 A | 4/2008 |
| WO | 2010016169 A1 | 2/2010 |

OTHER PUBLICATIONS

The international search report for PCT/JP2011/061812 mailed on Aug. 30, 2011.

* cited by examiner

MULTIPROCESSOR SYSTEM, EXECUTION CONTROL METHOD AND EXECUTION CONTROL PROGRAM

TECHNICAL FIELD

The present invention relates to improvement of a multiprocessor system and, more particularly, a multiprocessor system which enables speed-up of the system without hindering flexibility and expandability of parallel execution control processing.

BACKGROUND ART

Multiprocessor systems are roughly classified into two, a system designed to execute symmetric multiprocessing (SMP) in which each processor is homogeneous and a system designed to execute asymmetric multiprocessing (AMP) in which each processor is heterogeneous.

Here, the latter heterogeneous multiprocessor system in general employs a control method of directly controlling execution of other plurality of sub-processors by a main processor (MP).

In this method, the main processor which manages the entire system to execute main processing also executes activation control of each of functionally-distributed sub-processors.

On this occasion, control of each sub-processor is realized by using a system bus whose access right is held by the main processor, by which bus a notification of processing completion from each sub-processor is made after input of each interrupt signal from each sub-processor to check a state of each sub-processor by using the system bus.

Such a control method as described above has advantages of facilitating consideration and implementation of a control sequence of the entire multiprocessor system and having high observability for debugging because state management of the entire system and state management of each sub-processor can be aggregated in one place.

This, however, has a problem of a processing failure because late increase in scale of system LSIs and complication of the same cause processing loads to be centralized in the main processor.

The technique having a parallel-execution dedicated execution control unit is proposed as related art such as that disclosed in Patent Literature 1 in order to solve the problem.

The related art recited in Patent Literature 1 is enabling an increase in the rate of operation due to decentralization of main processor loads and parallel execution of the respective sub-processors by implementing a control mechanism which operates at least two sub-processors in parallel in a pipeline fashion.

The execution control unit has a circuit configuration dependent on the number of sub-processors to be connected such as input of a completion notification signal. In this case, it is a common practice for late system LSIs to have a plurality of sub-processors (IP cores) integrated on one chip, so that demanded is system expansion in a short TAT (Turn Around Time), that is, an increase in the number of cores. There accordingly occurs a need of changing a circuit configuration of the execution control unit or a capacity of an internal command table each time, resulting in having low expandability. Another problem is that such complicated execution control processing as includes three or more processings dependent on each other is difficult to realize and has low flexibility.

Proposed as another related art is such a technique as disclosed in Patent Literature 2 is a technique which enables improvement in flexibility and expandability of an execution control circuit dedicated to parallel execution control.

The related art recited in Patent Literature 2 achieves load decentralization of execution control processing and improvement in expandability and flexibility at the same time by providing the execution control circuit with an execution control processor, a status bus input unit for checking a processing status from each sub-processor, and a status FIFO whose capacity is variable.

This technique, however, requires a processing time on the order, for example, of several tens to several hundreds of cycles for execution control processing with respect to one processing status because execution control processing of each sub-processor is executed by software processing on the execution control processor.

Another problem is that since expansion of the number of sub-processors or the number of processing statuses directly leads to an increase in the amount of execution control processor processing, such a risk is increased as processing failure of the processor or the need of an increase in the number of execution control circuits.

Proposed as other related art is such a technique as disclosed in Patent Literature 3 which enables speed-up of sub-processor control by a main processor by using an instruction buffer and a response buffer.

According to the related art recited in Patent Literature 3, spontaneous read of an instruction buffer by an idle sub-processor eliminates the main processor's need of recognizing which sub-processor is idle, thereby speeding up sub-processor control.

The technique is, however, premised on homogeneous symmetric multiprocessing (SMP) in which each sub-processor is capable of processing any task, so that it is in the first place not applicable to a multiprocessor system having heterogeneous asymmetric multiprocessing (AMP) targeted by the present invention.

Similarly to the related art recited in Patent Literature 2, because of software processing by the main processor, the technique requires a processing time on the order of several tens to several hundreds of cycles for execution control processing of one task even when speed-up of the processing is realized.

Patent Literature 1: Japanese Patent Laying-Open No. 2003-208412
Patent Literature 2: International Publication WO2010/016169A1
Patent Literature 3: Japanese Patent Laying-Open No. H09-218859

The first problem to be solved is that when execution control of each sub-processor is realized in a multiprocessor system by using not a main processor but a dedicated execution control processor (CP), its execution control processing time (latency) might cause a processing failure of the multiprocessor system as a whole.

The reason is that with a further demand for speed-up of late image processing system LSIs or communication processing system LSIs, a processing time required for execution control between the respective sub-processors exerts an adverse effect of increasing a possibility that entire processing will not be finished in time. For a data processing system where data is processed in a pipeline fashion by sequentially using the respective sub-processors, in particular, it will be crucial in the future how much time overhead in processing of the respective sub-processors can be reduced.

When execution control processing by an execution control processor is realized as a whole in dedicated hardware to speed up processing, for example, reduction in flexibility and expandability will occur as a second problem which will be described later.

Second problem is low flexibility and expandability of a multiprocessor system as a whole when implementing execution control dedicated hardware.

The reason is that an interface and a circuit configuration of an execution control unit are in general liable to depend on the number of sub-processors connected or the number of processing statuses. In other words, when increasing the number of sub-processors or the number of processing statuses for expanding the system, circuit change is required such as change of an interface or a table capacity of the execution control unit itself.

Further problem is that it is in general difficult to realize such complicated execution control processing as includes processing by three or more sub-processors dependent on each other by using dedicated hardware including table look-up. Even when the processing is realized by using a complicated circuit configuration, if the circuit is specialized in the execution control processing in question, its flexibility and expandability will be very low.

OBJECT OF THE PRESENT INVENTION

An object of the present invention is to provide a multiprocessor system which solves the above-described problems and enables speed-up of processing without hindering flexibility and expandability of parallel execution control processing.

SUMMARY

According to a first exemplary aspect of the invention, a multiprocessor system includes one or a plurality of main processors and a plurality of sub-processors, and an execution control circuit which conducts execution control of each the sub-processors, wherein the execution control circuit comprises an execution control processor for execution control processing of each the sub-processors, a control bus output unit for activation of a command to each the sub-processors, a status bus input unit for status notification from each the sub-processors, a determination circuit which determines whether or not the status notification has one-to-one dependency with a processing command to be issued next on an operation sequence and is to be processed at a high speed, a status accelerator which issues a corresponding processing activation command when the status notification is to be processed at a high speed, and a status FIFO control unit which processes the status notification by using the execution control processor.

According to a second exemplary aspect of the invention, a sub-processor execution controlling method in a multiprocessor system comprising one or a plurality of main processors and a plurality of sub-processors, wherein an execution control circuit which conducts execution control of each the sub-processors is provided, a determination circuit of the execution control circuit determines whether or not a status notification from each the sub-processors has one-to-one dependency with a processing command to be issued next on an operation sequence and is to be processed at a high speed, a status accelerator of the execution control circuit issues a corresponding processing activation command when the status notification is to be processed at a high speed, and a status FIFO control unit of the execution control circuit processes the status notification by using an execution control processor for execution control processing of each the sub-processors.

According to a third exemplary aspect of the invention, an execution control program executed on a multiprocessor system comprising one or a plurality of main processors and a plurality of sub-processors, which causes an execution control circuit which conducts execution control of each the sub-processors to execute a function of a determination circuit of the execution control circuit to determine whether or not a status notification from each the sub-processors has one-to-one dependency with a processing command to be issued next on an operation sequence and is to be processed at a high speed, a function of a status accelerator of the execution control circuit to issue a corresponding processing activation command when the status notification is to be processed at a high speed, and a function of a status FIFO control unit of the execution control circuit to process the status notification by using an execution control processor for execution control processing of each the sub-processors.

The present invention enables provision of a multiprocessor system which allows speed-up of processing without hindering flexibility and expandability of parallel execution control processing.

EXEMPLARY EMBODIMENT

Next, exemplary embodiments of the present invention will be described in detail with reference to the drawings. In all the drawings, like components are identified by the same reference codes to appropriately omit description thereof.
(First Exemplary Embodiment)

In the first exemplary embodiment, with respect to a case where as a multiprocessor system in the present invention, an execution control circuit as invented is applied to a data coding/decoding processing system, detailed description will be made of a basic structure, features and operation of the system with respect to the Example 1 and the like. In the following drawings, no description will be made of a structure of a part not related to a gist of the present invention and no illustration will be made thereof.

Figure 1:
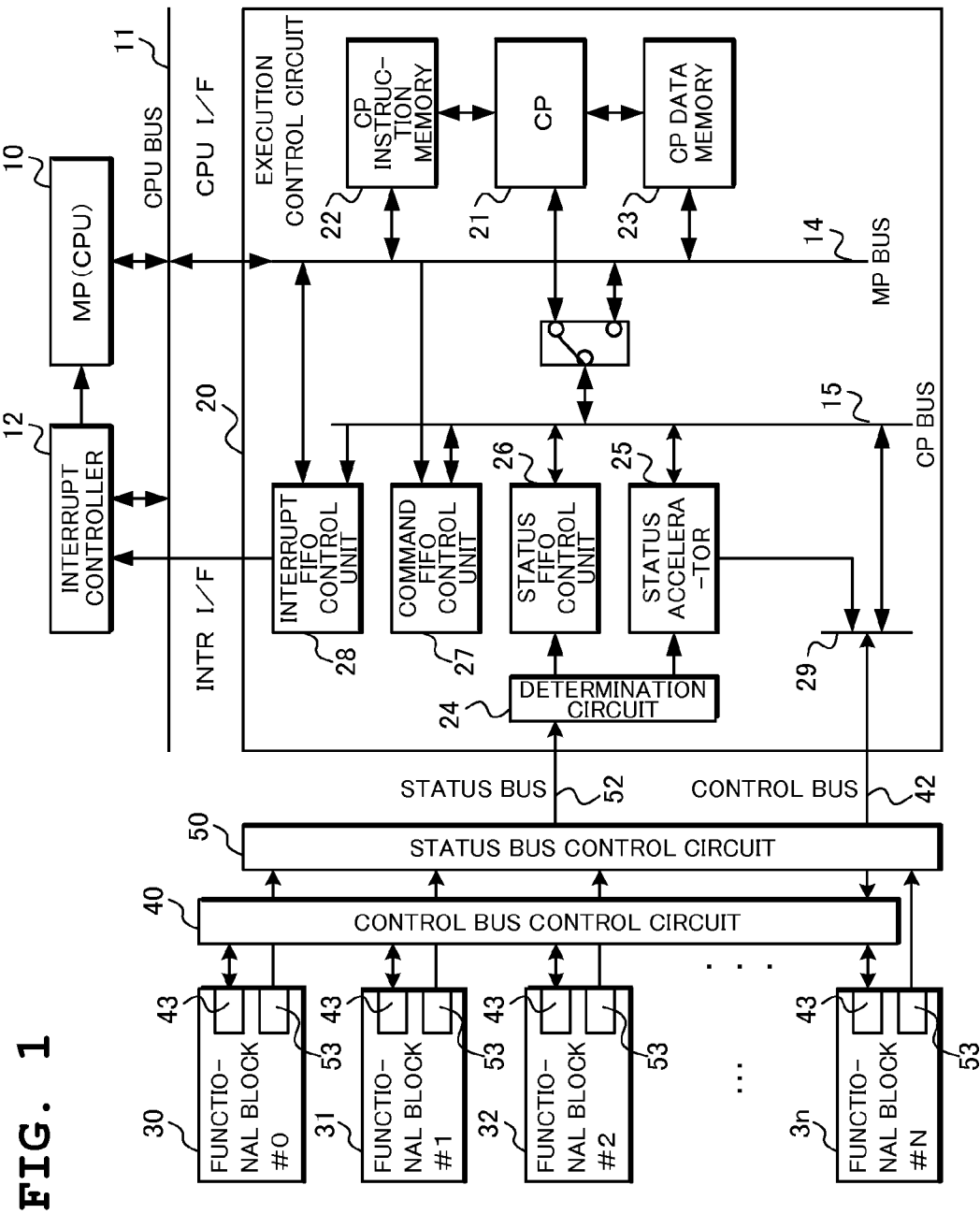
FIG. 1 is a diagram showing a structure of a multiprocessor system in a first exemplary embodiment of the present invention.

FIG. 1 is a diagram showing an entire structure of a system in which an execution control circuit for controlling execution of a plurality of sub-processors is implemented as an example of a multiprocessor system which is the first exemplary embodiment of the present invention.

The multiprocessor system in the present invention includes a main processor (MP(CPU)) 10, a CPU bus 11 as a system bus of the main processor and an interrupt controller 12 as a peripheral block on the side of the main processor, and sub-processors (functional blocks) 30 to 3n on the side of the sub-processors. n (an arbitrary natural number not less than 1) represents the number of sub-processors.

The main processor (MP (CPU)) 10 executes execution control on the sub-processor side by using the CPU bus 11 and checks a state on the sub-processor side by using an interrupt signal applied to the interrupt controller 12.

In the first exemplary embodiment, an execution control circuit 20 as the present invention is implemented between the main processor (MP (CPU)) 10 and the sub-processors (functional blocks) 30 to 3n. The execution control circuit 20 comprises an execution control processor (CP) 21, input/output interfaces (CPU I/F (Interface), INTR I/F) to/from the main processor (MP(CPU)) 10, a control bus 42 and a status bus 52 as input/output interfaces to/from the sub-processors. The execution control circuit 20 can be internally provided with a CP instruction memory 22 and a CP data memory 23 for the execution control processor (CP) 21.

INTR I/F here represents an interrupt interface.

Between the execution control circuit 20 and the respective sub-processors (functional blocks) 30 to 3n, provided are a control bus control circuit 40 for the execution control circuit 20 to control the sub-processors (functional blocks) 30 to 3n, and a status bus control circuit 50 for the sub-processors (functional blocks) 30 to 3n to notify the execution control circuit 20 of a processing status.

As an input interface in the execution control circuit 20 from the respective sub-processors (functional blocks) 30 to 3n, not a dedicated line such as an interrupt signal but the status bus 52 is used, and the provision of the status bus control circuit 50 between the execution control circuit 20 and the sub-processors (functional blocks) 30 to 3n allows the execution control circuit 20 to have a hardware configuration not dependent on the number of sub-processors.

Provided in the execution control circuit 20 for the input of the status bus 52 are a determination circuit 24, a status accelerator 25 and a status FIFO (First-In First-Out) control unit 26. Status data input through the status bus 52 is assumed to have a data format with a sub-processor ID added to a processing ID and a processing status value related to its status notification on the status bus control circuit 50.

Input status data is here designed to enable determination whether it is a simple processing status having one-to-one dependency with a processing command issued next at the determination circuit 24 and to be transferable to the status accelerator 25 or the status FIFO control unit 26. Then, the status accelerator 25 is designed to be capable of automatically issuing a corresponding processing command when receiving input of a simple processing status.

Output of the control bus 42 from the execution control circuit 20 for issuing a command to the respective sub-processors (functional blocks) 30 to 3n and provision of the control bus control circuit 40 between the execution control circuit 20 and the sub-processors (functional blocks) 30 to 3n realize the execution control circuit 20 whose structure is not dependent on the number of sub-processors.

Here, in the execution control circuit 20, an access from the execution control processor (CP) 21 and an access from the status accelerator 25 are arbitrated by a command arbitration circuit 29 for output.

As interfaces in the execution control circuit 20 with the main processor (MP (CPU)) 10 side, a command FIFO control unit 27 for command input from the main processor (MP (CPU)) 10 is provided and an interrupt FIFO control unit 28 for interrupt factor notification to the main processor (MP (CPU)) 10 is provided.

Since in a common method of implementing a common interrupt factor register, the number of factors depends on the number of registers to have low expandability, the interrupt FIFO control unit 28 having higher flexibility is assumed to be provided.

Designing the FIFOs such as the status FIFO control unit 26, the command FIFO control unit 27 and the interrupt FIFO control unit 28 to be shared by the use of the same memory or the like enables the number of stages of each FIFO to be flexibly changed involving no problem.

The respective sub-processors (functional blocks) 30 to 3n are each structured to include a command reception control unit 43 for accepting a command from the execution control circuit 20 and a status notification control unit 53 for notifying the execution control circuit 20 of such a status as processing completion.

The command reception control unit 43 is connected as a slave (acceptance side) of the control bus and has a function of transmitting an obtained command to the inside of the sub-processor.

The status notification control unit 53 is connected as a master (sending side) of the status bus and has a function of transferring a status value from the sub-processor to the execution control circuit 20.
(Description of Operation of the First Exemplary Embodiment)

Next, detailed description will be made of operation of the present exemplary embodiment with reference to FIG. 1 to FIG. 12.

Figure 2:
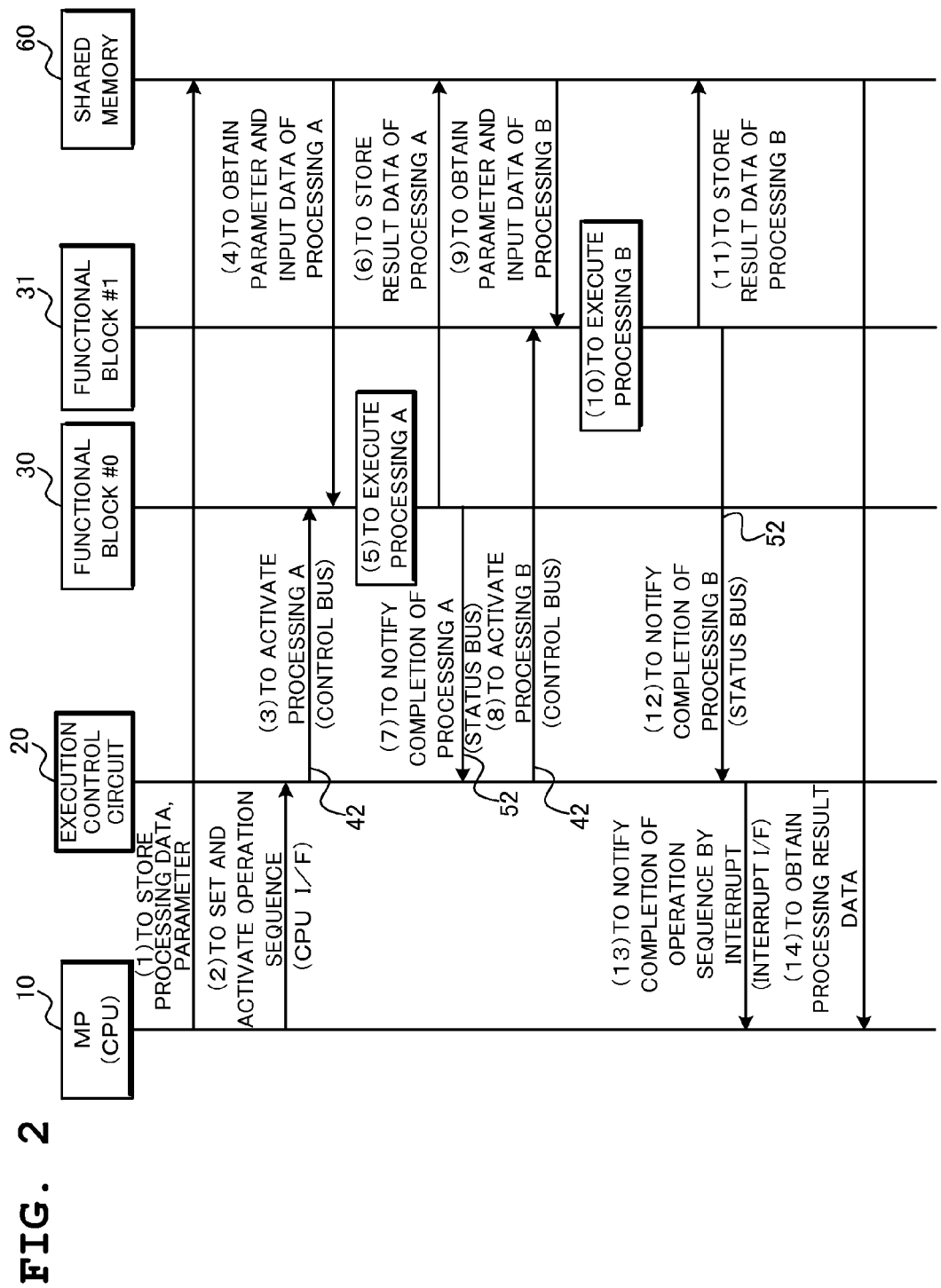
FIG. 2 is a diagram showing an exemplary processing flow for controlling parallel execution of sub-processors premised in the present invention.

FIG. 2 is a diagram showing an example of a processing flow for executing parallel execution control of the plurality of the sub-processors (functional blocks) 30 to 3n by means of the execution control circuit 20 shown in FIG. 1.

(1) When a parameter or the like for operating the sub-processor exists, the main processor (MP (CPU)) 10 writes the parameter or the like into a region accessible from each of the sub-processors (functional blocks) 30 to 3n such as a shared memory 60. This processing is not essential for the present invention.

(2) After setting an operation sequence through the CPU IX for causing the plurality of sub-processors (functional blocks) 30 to 3n to operate in conjunction with the execution control circuit 20, the main processor (MP (CPU)) 10 issues a command for starting an operation sequence or other by using the command FIFO control unit 27.

(3) The execution control circuit 20 causes the sub-processor 30 (functional block #0) to activate processing A at timing designated by the operation sequence from the main processor (MP (CPU)) 10 by using the control bus 42.

(4) The sub-processor 30 (functional block #0) obtains a parameter and input data necessary for the processing A from the shared memory 60 based on an activation command from the execution control circuit 20.

(5) The sub-processor 30 (functional block #0) executes the processing A. Use a local memory in the sub-processor 30 (functional block #0) as required.

(6) The sub-processor 30 (functional block #0) stores result data of the processing A in the shared memory 60.

(7) The sub-processor 30 (functional block #0) notifies the execution control circuit 20 of completion of the processing A through the status bus 52.

(8) After recognizing the processing A completion, the execution control circuit 20 causes the sub-processor 31 (functional block #1) to activate processing B by using the control bus 42 according to the operation sequence set by the main processor (MP (CPU)) 10.

(9) The sub-processor 31 (functional block #1) obtains a parameter and input data necessary for the processing B from the shared memory 60 based on an activation command from the execution control circuit 20.

(10) The sub-processor 31 (functional block #1) executes the processing B. Use a local memory in the sub-processor 31 (functional block #1) as required.

(11) The sub-processor 31 (functional block #1) stores result data of the processing B in the shared memory 60.

(12) The sub-processor 31 (functional block #1) notifies the execution control circuit 20 of completion of the processing B through the status bus 52.

(13) After recognizing the processing B completion, the execution control circuit 20 notifies the main processor (MP (CPU)) 10 of the processing completion by an interrupt signal by means of the INTR I/F according to the operation sequence set by the main processor (MP (CPU)) 10.

(14) After recognizing the processing completion by interrupt, the main processor (MP (CPU)) 10 obtains processing result data from the shared memory 60 as required.

As to such operation of issuing a command (activation of processing) to a subsequent sub-processor upon receiving a status notification (processing completion) from the sub-processor as operation shown in the above (8) ((8) in FIG. 2), the execution control circuit 20 of the present invention is allowed to select either of the following cases.

Case (hardware processing) of automatically issuing a subsequent command by direct table look-up at the status accelerator 25 through determination by the determination circuit 24 by using all or a part of bits of received status data.

Case of software processing at the execution control processor (CP) 21 via the status FIFO control unit 26.

Figure 3:
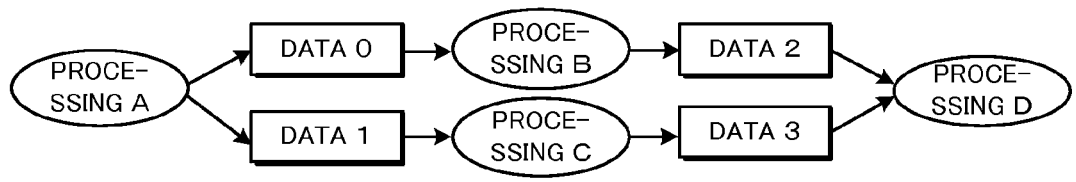
FIG. 3 is a diagram showing an example of an operation sequence premised in the present invention.
Figure 4:
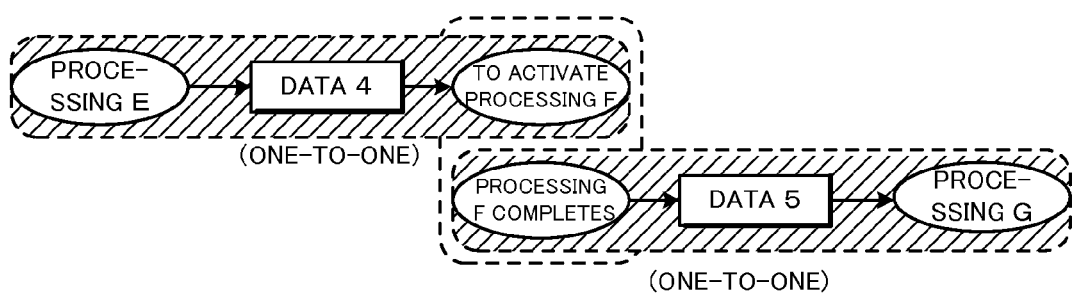
FIG. 4 is a diagram showing an example of an operation sequence which can be processed at a high speed that is premised in the present invention.

FIG. 3 and FIG. 4 are diagrams showing examples of the operation sequence (dependency of processing of the respective sub-processors) shown in FIG. 2.

The example of FIG. 3 shows a case where with data 0 and data 1 existing as output data of the processing A, the processing B uses the data 0 as input data and data 2 as output data, processing C uses the data 1 as input data and data 3 as output data, and processing D uses, as input data, the data 2 and the data 3 which are outputs of the processings B and C.

In the example of FIG. 3, the execution control circuit 20 issues a command for activating the processing B upon receiving a status notification that write of the data 0 is completed from the sub-processor which executes the processing A and issues a command for activating the processing C upon receiving a status notification that write of the data 1 is completed.

Issue a command for activating the processing D upon receiving both a status notification that write of the data 2 is completed from the sub-processor which executes the processing B and a status notification that write of the data 3 is completed from the sub-processor which executes the processing C.

The example of FIG. 4 shows a case where processing E uses data 4 as output data, processing F uses only the data 4 as input data, processing F uses data 5 as output data and processing G uses only the data 5 as input data.

In the example shown in FIG. 4, a status notification of processing E completion and command issuance for activating the processing F have a one-to-one relationship with the data 4 provided therebetween. Similarly, a status notification of processing F completion and command issuance for activating the processing G have a one-to-one relationship with the data 5 provided therebetween.

With respect to execution control processing of a part where a relationship between a processing status and subsequent command issuance between successive processings between the sub-processors has such one-to-one dependency, the execution control circuit 20 of the present invention is characterized in that the determination circuit 24 makes determination of the processing status to enable automatic issuance of a command in question by the status accelerator 25 (hardware processing).

In the present invention, such operation sequences as shown in FIG. 3 and FIG. 4, after being defined as a structure group having a structure defining each processing and a structure defining each data linked with each other, is stored in the CP data memory 23. Then, the execution control processor (CP) 21 recognizes which data has a change (for which data, processing has been executed) and which sub-processor is in operation (or processing completion) from each status notification obtained and analyzes a link (dependency between processing and data) of a structure group stored in the CP data memory 23, thereby issuing a processing command operable next to each of the sub-processors (functional blocks) 30 to 3n.

More specifically, when in each processing shown in FIG. 3, all input data for the processing is prepared, an output data writing destination is free and a sub-processor (arithmetic resource) for the execution of the processing is executable (not in operation), a relevant processing command is issued to the sub-processor in question.

Execution of such operation by the execution control circuit 20 realizes such a processing flow as shown in FIG. 2 and in a case of processing of input data generated in a pipeline fashion, also enables a series of processing to be executed in parallel by the sub-processors (functional blocks) 30 to 3n in a pipeline fashion.

With respect to such execution control processing of a simple operation sequence having one-to-one dependency between a processing status and subsequent command issuance between the sub-processors as shown in FIG. 4, not storing its structure group on the CPU data memory 23 but storing its correspondence table in the status accelerator 25 enables speed up of the execution control processing in question not by software processing by means of the execution control processor (CP) 21 but by hardware processing by means of the status accelerator 25.

Next, FIG. 5 to FIG. 9 show exemplary operation of each processing flow shown in FIG. 2.

Figure 5:
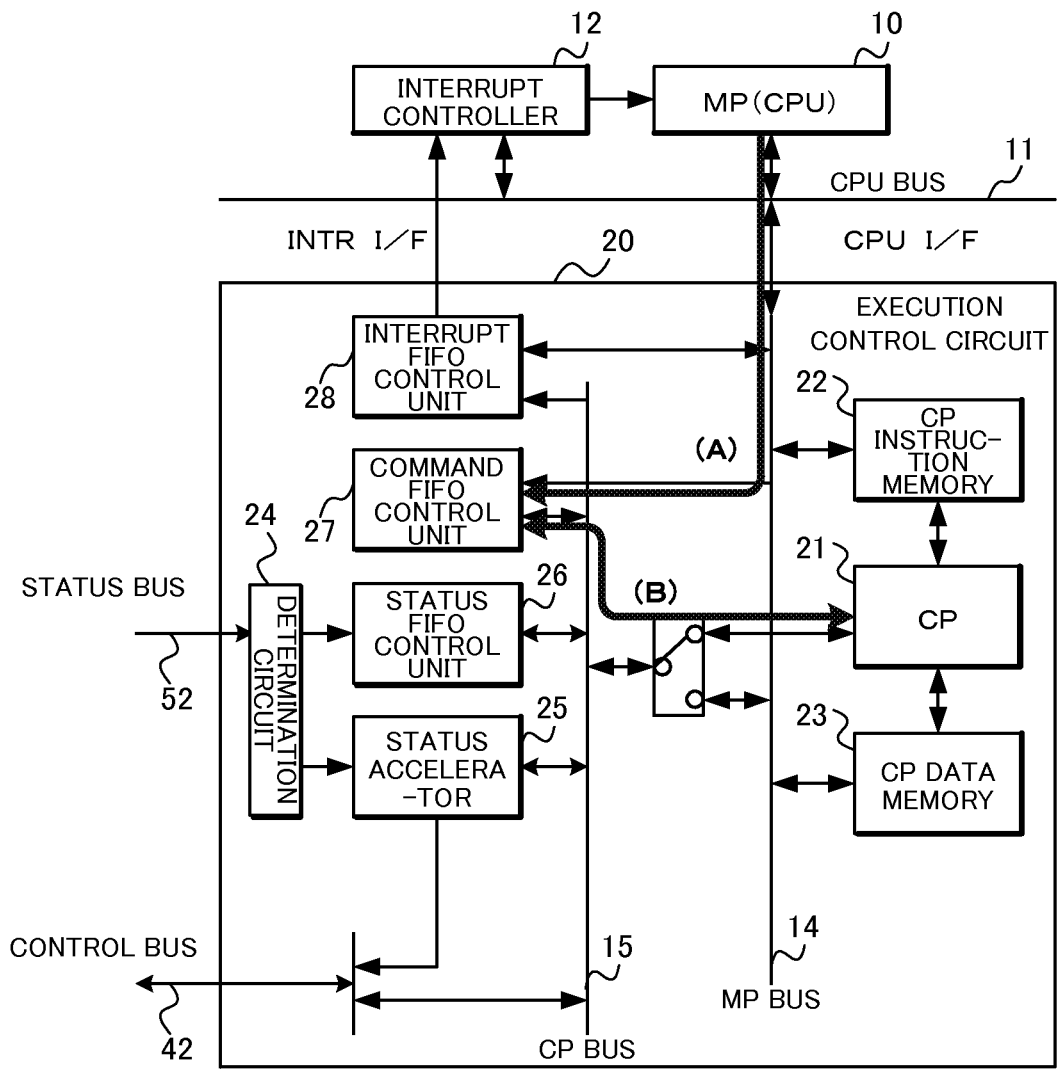
FIG. 5 is a diagram showing a sequence for setting a command from a main processor in the present invention.

FIG. 5 is a diagram showing such exemplary operation of issuing a command from the main processor (MP (CPU)) 10 to the execution control circuit 20 by using the command FIFO control unit 27 as shown in FIG. 2 (2).

(A) Writing desired command data to the command FIFO control unit 27 from the main processor (MP (CPU)) 10 through an MP bus 14 results in generating an interrupt signal to the execution control processor (CP) 21 in the execution control circuit 20, so that (B) the execution control processor (CP) 21 is allowed to obtain command data from the command FIFO control unit 27.

Figure 6:
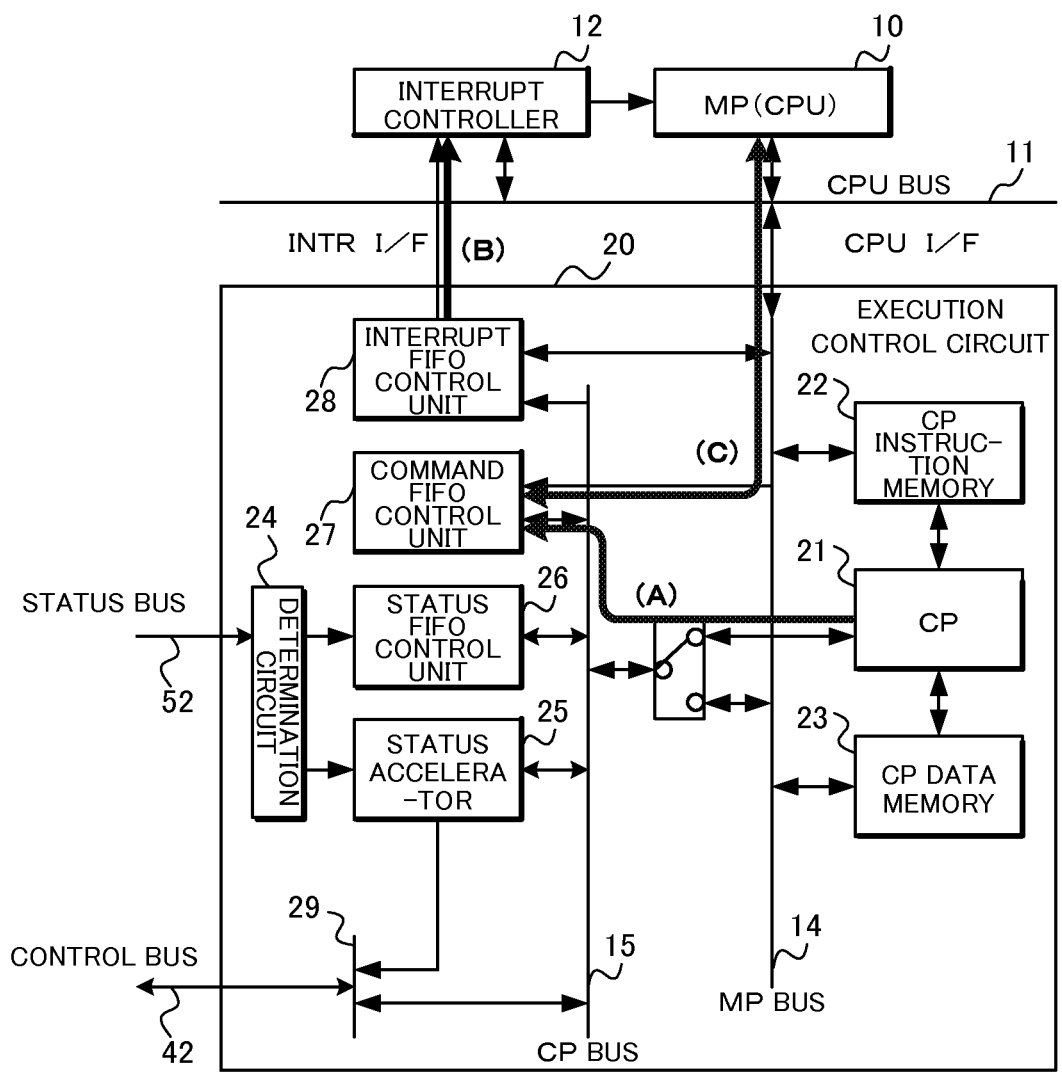
FIG. 6 is a diagram showing a sequence for notifying the main processor of interrupt in the present invention.

FIG. 6 is a diagram showing such exemplary operation of notifying the main processor (MP (CPU)) 10 of completion of an operation sequence or the like from the execution control circuit 20 by an interrupt signal as shown in FIG. 2 (13) by using the interrupt FIFO control unit 28.

(A) Writing interrupt factor data such as sequence completion to the interrupt FIFO control unit 28 through the CP bus 15 from the execution control processor (CP) 21 results in (B) notifying the main processor (MP (CPU)) 10 of an interrupt signal through the interrupt controller 12 or the like. (C) The main processor (MP (CPU)) 10 is capable of sequentially obtaining its factor data from the interrupt FIFO control unit 28 and recognizing which operation sequence is completed or the like.

Figure 7:
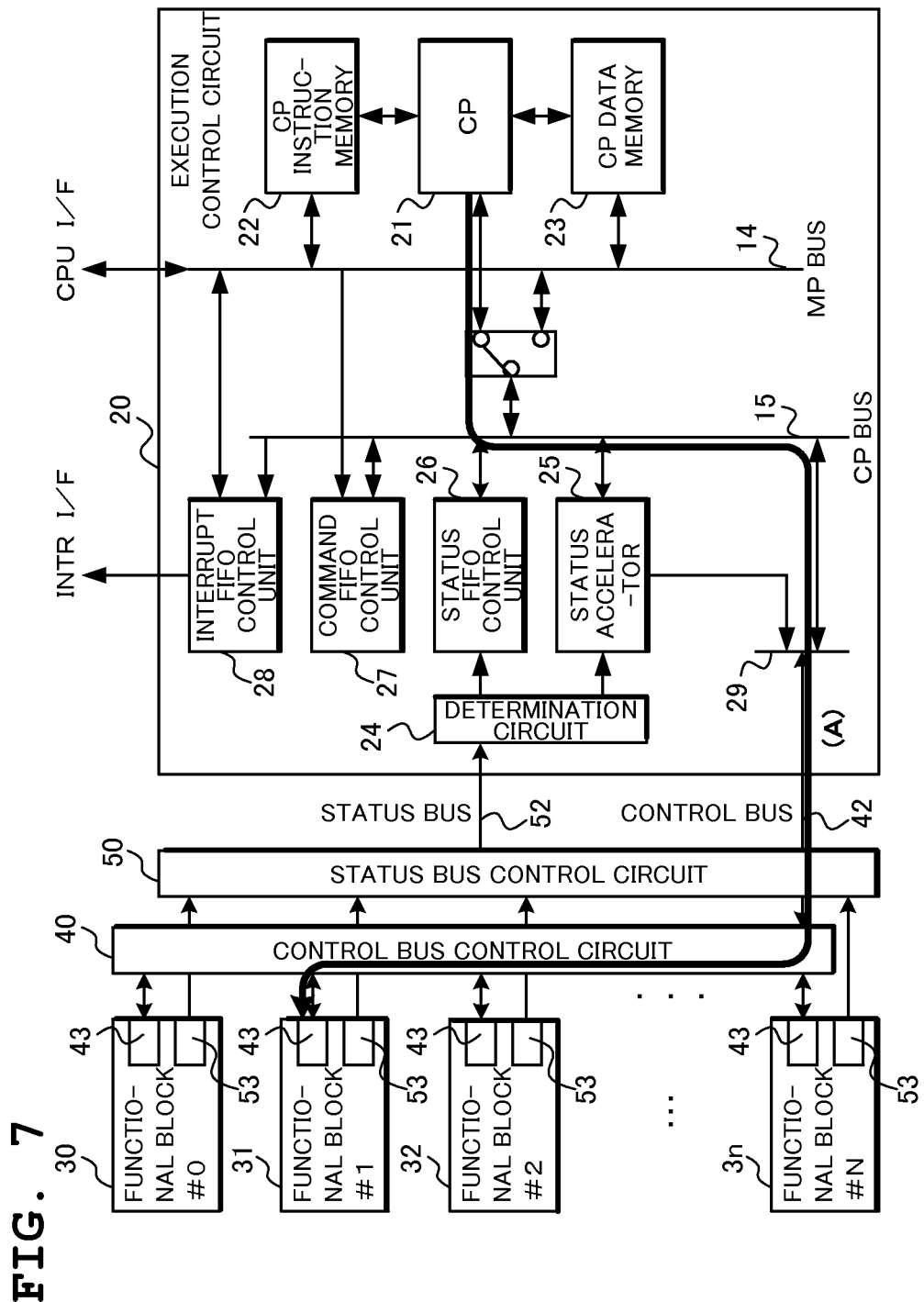
FIG. 7 is a diagram showing a sequence for issuing a command to the sub-processor in the present invention.

FIG. 7 is a diagram showing such exemplary operation of issuing a processing activation command from the execution control processor (CP) 21 to each of the sub-processors (functional blocks) 30 to 3n as shown in FIG. 2 (3) and FIG. 2 (8). When a processing activation command in question is such a processing activation command having one-to-one dependency with a related processing status as shown in FIG. 4, refer to FIG. 9 and description of operation thereof which will be made later.

(A) After setting a necessary parameter such as a processing ID (instruction number) to a sub-processor (functional block) in charge of the processing in question through the control bus 42, the execution control processor (CP) 21 issues the processing activation command.

Upon obtaining the processing command at the command reception control unit 43, the sub-processor (functional block) side transmits the set necessary parameter or the like into the sub-processor (functional block) to execute the processing designated by the processing ID (instruction number) or the like.

The control bus control circuit 40, which is realized, for example, by a single layer bus structure, executes address decoding for a control bus access from the execution control circuit 20 to realize a bus access with a selected sub-processor.

Figure 8:
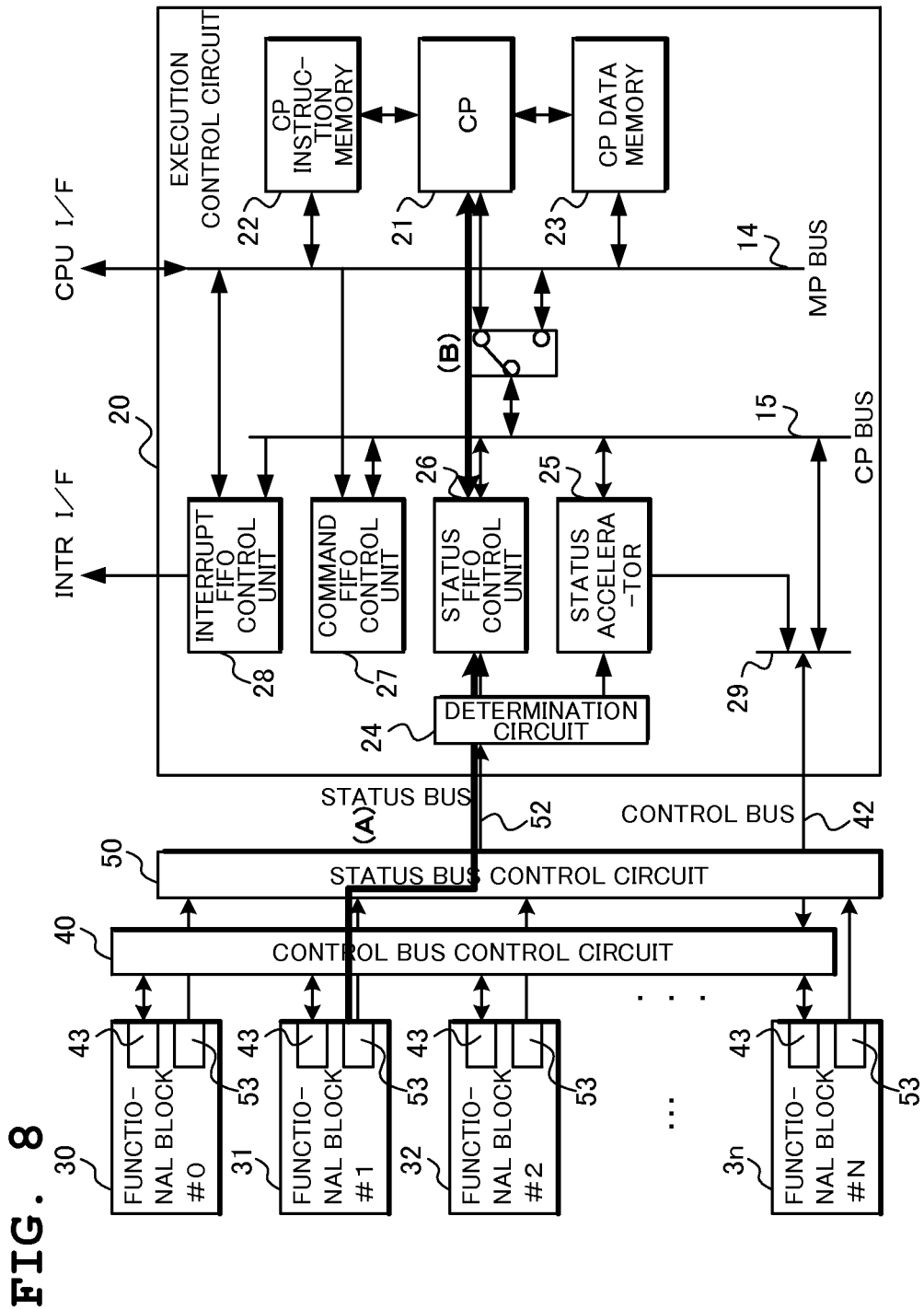
FIG. 8 is a diagram showing a sequence for notifying a status from the sub-processor in the present invention.

FIG. 8 is a diagram showing such exemplary operation of notifying the execution control circuit 20 of a status by each of the sub-processors (functional blocks) 30 to 3n as shown in FIG. 2 (7) and FIG. 2 (12). When a processing status in question is such a processing status having one-to-one dependency with a processing command to be issued next as shown in FIG. 4, refer to FIG. 9 and description of operation thereof which will made later.

(A) Each sub-processor (functional block) transfers and outputs desired status data (a processing ID, its status value, etc.) by means of the status notification control unit 53 and when the notified status data is stored in the status FIFO control unit 26 via the determination circuit 24 in the execution control circuit 20, the interrupt signal is output to the execution control processor (CP) 21, so that (B) the execution control processor (CP) 21 obtains the status data in question from the status FIFO control unit 26.

When status bus accesses from the respective sub-processors (functional blocks) 30 to 3n contend, the status bus control circuit 50, which is realized by, for example, a single layer bus structure, executes access arbitration by using the "round robin system" or the like to transfer a status buss access from a selected sub-processor to the execution control circuit 20.

Figure 9:
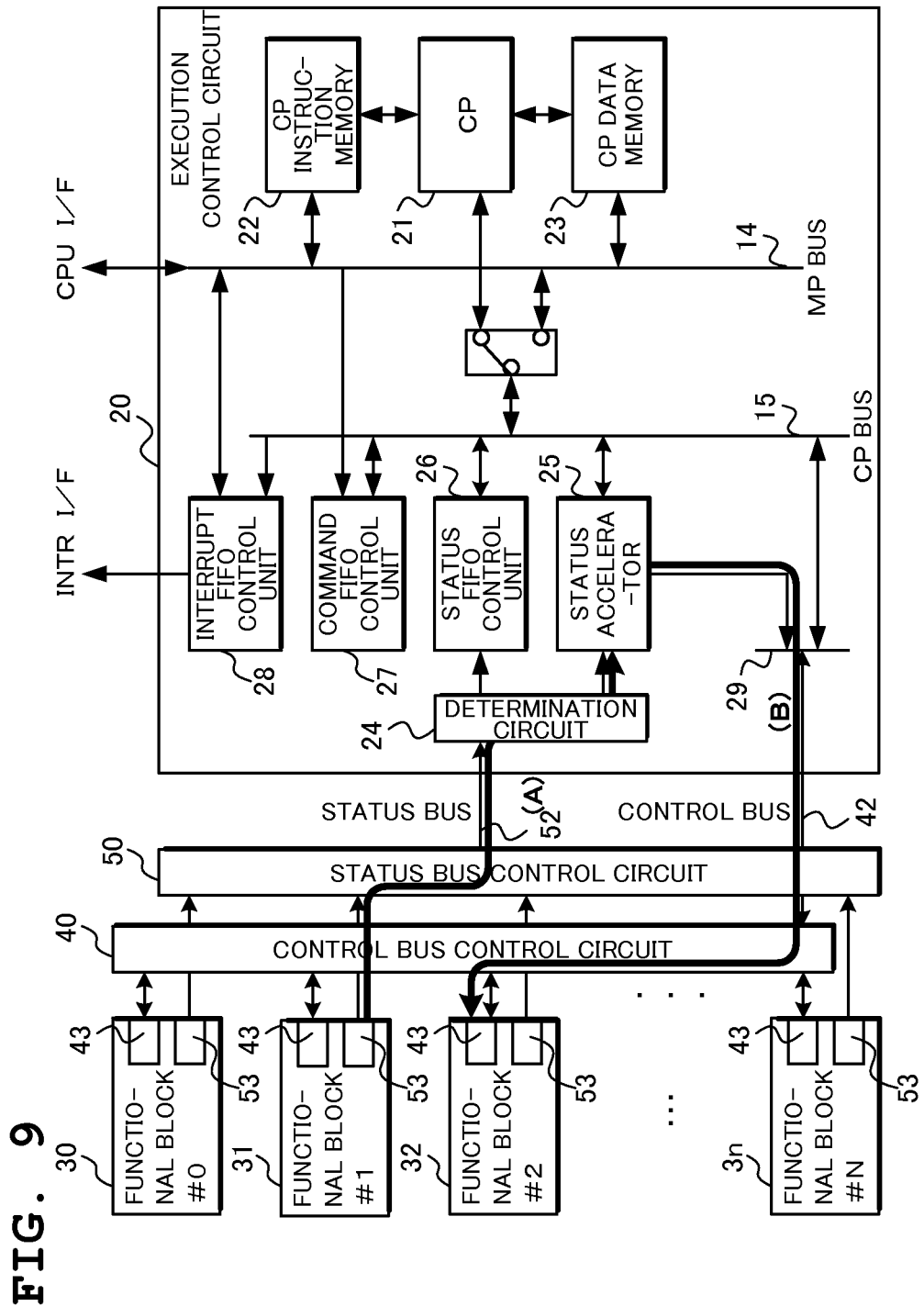
FIG. 9 is a diagram showing an execution control processing sequence by a status accelerator in the present invention.

FIG. 9 is a diagram showing exemplary operation of notifying the execution control circuit 20 of a processing status by the respective sub-processors (functional blocks) 30 to 3n and automatically issuing a processing command having one-to-one dependency with the processing status to the relevant one of the respective sub-processors (functional blocks) 30 to 3n as shown in FIG. 2 (7), FIG. 2 (8) and FIG. 4.

(A) Each sub-processor (functional block) transfers and outputs desired status data (a processing ID, its status value, etc.) by means of the status notification control unit 53 and when the notified status data is determined to be the processing status having one-to-one dependency by the determination circuit 24 in the execution control circuit 20, the data is transferred to the status accelerator 25. (B) The status accelerator 25 uses the transferred processing status value to look up in a command table set in advance, and obtains a corresponding processing command (a sub-processor ID, a processing ID (instruction number) etc.) to automatically issue a command for setting of a processing ID (instruction number) etc. or for processing activation to the relevant sub-processor. For operation of the command reception control unit 43 on the sub-processor side and operation of the control bus control circuit 40 which are the same as those in FIG. 7, refer to the above description with respect to FIG. 7.

(Description of Status Data Format)

Figure 10:
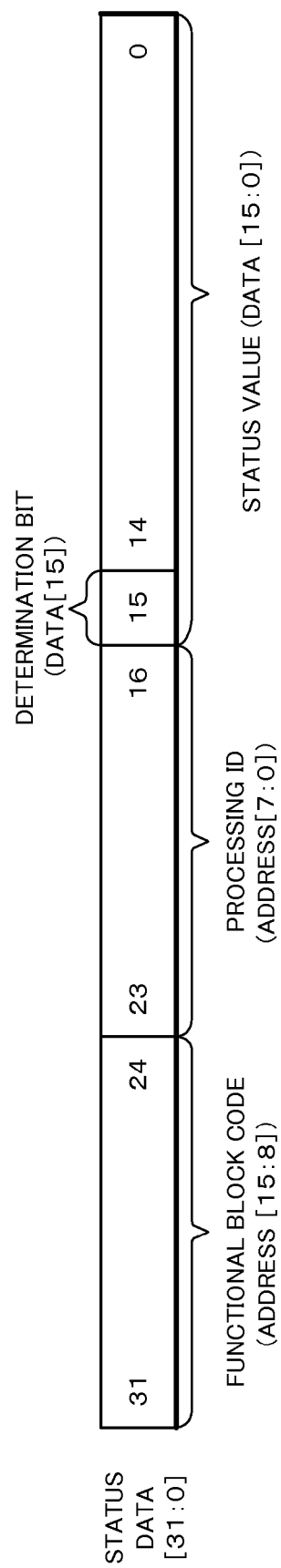
FIG. 10 is a diagram showing a format of status data in the first exemplary embodiment of the present invention.

FIG. 10 is a diagram showing an example of a data format of status data in the present exemplary embodiment. Transfer of status data is realized through the status bus 52. The respective sub-processors (functional blocks) 30 to 3n each notify, for example, a processing ID (instruction number) as an address signal of the status bus 52 and its status value (a value indicative of input data read completion, output data write completion, processing completion, etc.) as a data signal. The data is notified to the execution control circuit 20 with a sub-processor ID added by using a higher-order bit or the like of the address signal on the status bus control circuit 50.

The execution control circuit 20 in the present exemplary embodiment is here characterized in that each sub-processor is allowed to use an arbitrary bit (e.g. bit [15] in a case of the example shown in FIG. 10) of a status value to notify whether the status in question has one-to-one dependency with a processing command to be issued next.

As an example, the bit [15] being "1" represents a simple processing status having one-to-one dependency with a processing command to be issued next and the bit [15] being "0" represents the other ordinary processing status.

In the present exemplary embodiment, determination whether it is a simple processing status or not is made by the determination circuit 24 and when it is a simple processing status, a relevant status value is transferred to the status accelerator 25. Then, the processing status value or a part of its bits is used when looking up for a corresponding process command in a table at the status accelerator 25.

Here, as a bit for use in determination, the bit [15] shown in FIG. 10 is an exemplary only and other bits than the bit [15] can be used, or a plurality of arbitrary bits in status data can be used as a determination bit as well involving no problem.

In a case of an ordinary processing status, the execution control circuit 20 of the present invention does not implement a status register for each transfer address (processing ID) but stores, in the status FIFO control unit 26 in the execution control circuit 20, a sub-processor ID (functional block code), a processing ID (transfer address signal) and its status value (transfer data signal) in a data format including them in the lump as one status data.

The status bus 52 and such a data format produce an advantage that the execution control processor (CP) 21 is allowed to obtain which status (sub-processor ID, processing ID and its status value) it is that corresponds to which processing of which sub-processor only by reading status data once from the status FIFO control unit 26. Use of such a data format and sharing the status FIFO for other FIFO eliminate the need of implementation of an undue extra status register when considering future system expandability and produce an advantage of coping with expansion by a change of the number of stages of the status FIFO with ease.

(Description of Operation of the Determination Circuit 24)

Figure 11:
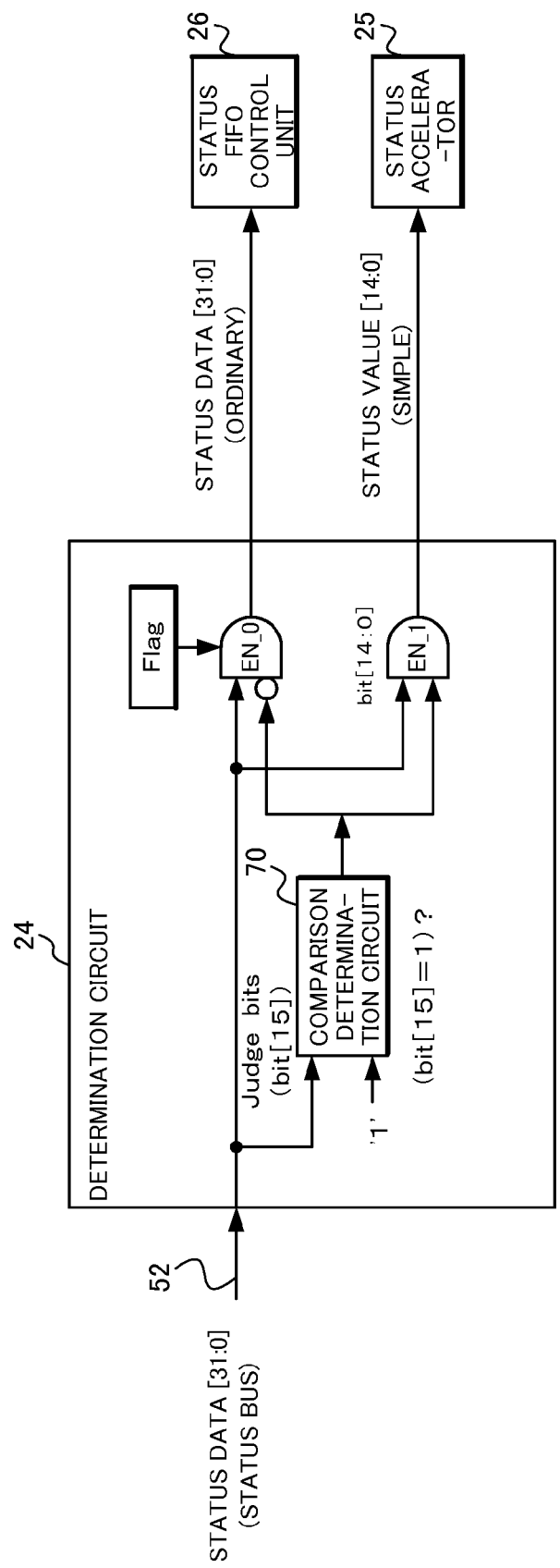
FIG. 11 is a diagram showing a structure of a determination circuit in the first exemplary embodiment of the present invention.

FIG. 11 shows a structure example of the determination circuit 24 in the present exemplary embodiment.

Upon input of status data from the status bus 52, the determination circuit 24 determines whether its processing status has one-to-one dependency with a subsequent processing command to execute high-speed processing.

More specifically, in the present exemplary embodiment, in a case, for example, where the bit [15] of the status data is assumed to be a determination bit, determination is made whether the bit [15] is "1" by using a comparison determination circuit 70 provided in the determination circuit 24.

Then, when determining that it is a simple processing status having one-to-one dependency with a processing command to be issued next (when the bit [15] is "1"), transfer the remaining bits of the status value (e.g. the bit [14:0]) to the status accelerator 25 (EN_1 is valid).

On the other hand, when it is determined not to be a simple but ordinary processing status (the bit [15] is "0"), transfer the relevant status data to the status FIFO control unit 26 (EN_0 is valid). As a bit for use in determination here, the bit [15] is exemplary and other bits than the bit [15] can be used, or a plurality of arbitrary bits in status data can be used for determination as well involving no problem.

The determination circuit 24 is also characterized in having a function of transferring all the status data to the status FIFO 26 irrespective of a determination result by using a flag (control register) for debugging or test, or the like, to enable checking or execution of the execution control processing by the execution control processor (CP) 21, and when the status is determined to have one-to-one dependency, transferring the data to both the status accelerator 25 and the status FIFO control unit 26.

The determination circuit 24, which is here realized by dedicated hardware, can be also realized with a structure having high flexibility and expandability whose function is changeable by changing a value of status data notified by a sub-processor because only status data is used for determination.

(Description of Operation of the Status Accelerator 25)

Figure 12:
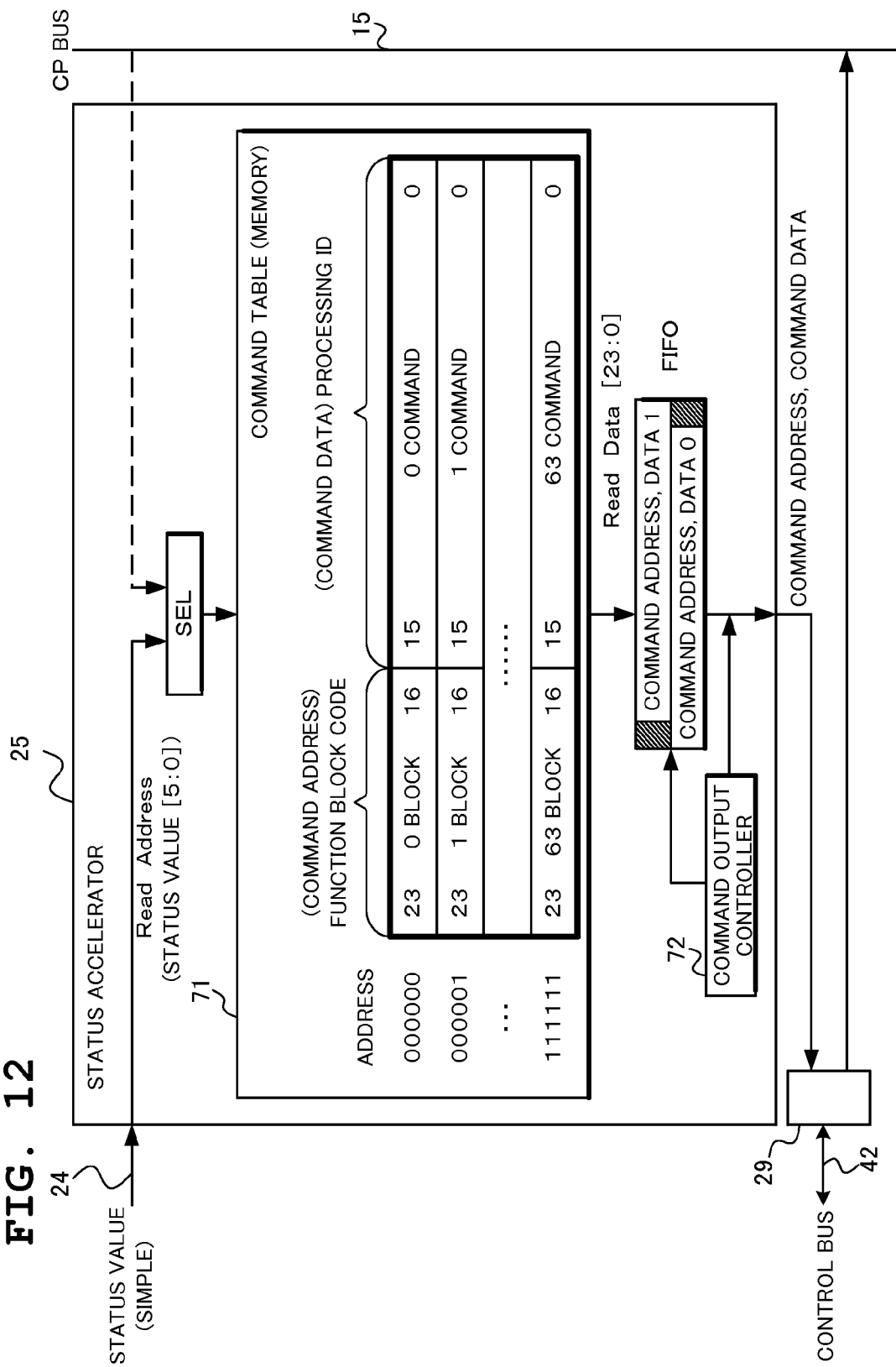
FIG. 12 is a diagram showing a structure of the status accelerator in the present invention.

FIG. 12 shows a structure example of the status accelerator 25 in the execution control circuit 20 of the present invention.

With a processing status value which is input from the determination circuit 24 and has a one-to-one dependency with a processing command to be issued next or a part of data equivalent to the value as an address, the status accelerator 25 reads a command table 71 (memory) in which the corresponding processing command is stored.

The command table 71 has storage of a sub-processor ID (functional block code) corresponding to a command address as an issuance destination of the processing command in question, a processing ID (instruction number) corresponding to the command data and the like. A command output controller 72 in the status accelerator 25 uses the read command address and command data to set a necessary parameter such as a processing ID (instruction number) to a sub-processor (functional block) in charge of the processing command in question and then automatically issues the processing activation command.

Here, a value of the command table 71 in the status accelerator 25 is designed to be writable from the execution control processor (CP) 21 or the main processor (MP (CPU)) 10 via the CP bus 15 at the time of system initial operation such as booting operation of the execution control processor (CP) 21.

Structuring the status accelerator 25 to be thus rewritable by using the command table 71 as described above has an advantage of flexibly changing or expanding the system after system LSI development such as determining which processing status is to be processed at high speed as a simple processing status or determining which processing status is to be processed by the execution control processor (CP) as an ordinary processing status.

A bus access to the control bus 42 which is output from the status accelerator 25 at the time of processing command issuance, when contends with an access from the execution control processor (CP) 21 via the CP bus 15, is arbitrated by the command arbitration circuit 29 and transferred to the control bus 42.

The command arbitration circuit 29 basically executes access arbitration which always gives preference to a bus access from the status accelerator 25. When a plurality of bus accesses are required for one processing command issuance, the circuit executes bus access arbitration so as to make as many times of accesses in succession as the required number of bus accesses.

The status accelerator 25 of the present invention, which is here realized by dedicated hardware, can be also realized with a structure having such high flexibility and expandability as enable a to-be-issued processing command or the like to be arbitrarily changeable by changing a value of the command table 71 by means of the main processor or the execution control processor because it uses table look-up of the command table 71 as its function. In other words, a set value of the command table 71 can be handled equally to an instruction code of an execution control processor or the like.

FIRST EXAMPLE

Figure 13:
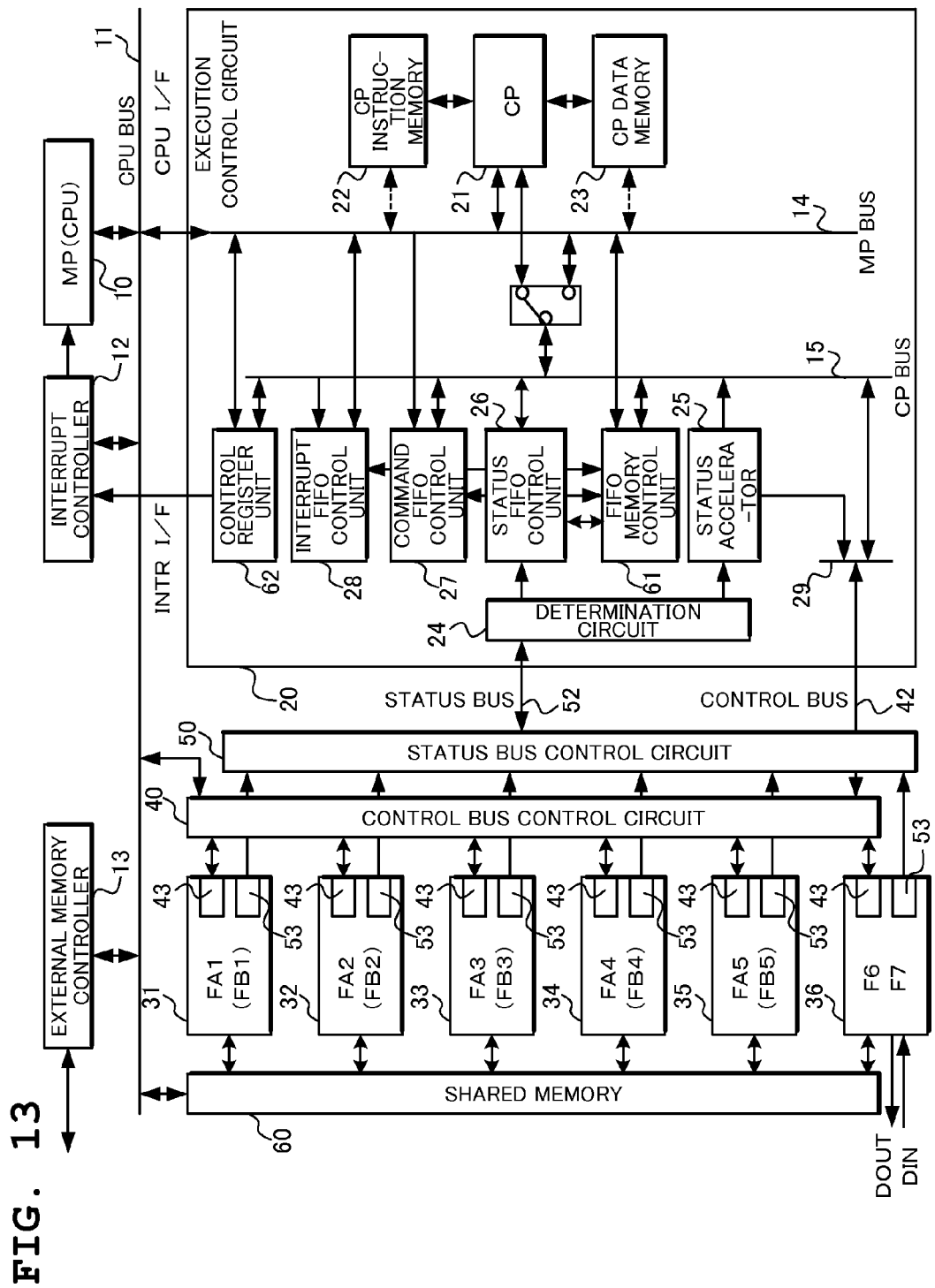
FIG. 13 is a diagram showing a data coding/decoding processing system in an Example 1 of the present invention.

FIG. 13 is a diagram showing, as a specific one of multiprocessor systems, an example of application of the present exemplary embodiment to a data coding/decoding processing system adapted to a plurality of coding processing systems (coding system A, coding system B).

(Description of Structure)

Provided are the main processor (MP(CPU)) 10 which controls the entire data coding/decoding processing system, the CPU bus 11, the interrupt controller 12, an external memory controller 13 and the like, provided as sub-processors (functional blocks) which execute data coding/decoding processing in practice are processor elements 31 to 35 (FA1, FA2, FA3, FA4, FA5) and provided as a sub-processor (functional block) which serves as an interface with the outside of the LSI is a processor element 36 (F6).

Implemented between the main processor (MP (CPU)) 10 and the respective sub-processors 31 to 36 is the execution control circuit 20 for executing parallel execution control of the plurality of sub-processors 31 to 36 which are features of the present invention, and provided between the execution control circuit 20 and the sub-processors 31 to 36 are the control bus control circuit 40 and the status bus control circuit 50.

Each of the sub-processors 31 to 36 comprises the command reception control unit 43 for receiving a command from the execution control circuit 20 through the control bus 42 and the status notification control unit 53 for notifying the execution control circuit 20 of a status through the status bus 52.

Since data transfer between the respective sub-processors is executed through the shared memory 60 in the LSI which memory is designed as a multibank memory, parallel access to the shared memory of a different bank is possible from the main processor (MP(CPU)) 10 and the respective sub-processors (functional blocks) 31 to 36. In addition, executing the data transfer between the respective sub-processors (functional blocks) 31 to 36 all through the shared memory 60 eliminates the need of a direct communication unit between the different sub-processors 31 to 36. In other words, such a multiprocessor structure as of the present exemplary embodiment expects an increase in a possibility of reuse of a sub-processor (functional block) and an increase in expandability of the system as a whole.

Here, in the execution control circuit 20 of the Example 1, control functions of the respective FIFOs such as the status FIFO control unit 26, the command FIFO control unit 27 and the interrupt FIFO control unit 28 shown in FIG. 1 are realized by the dedicated hardware circuits 26, 27 and 28. As to entity of FIFO, each FIFO structure is designed to be variable by its sharing by using a FIFO memory control unit 61 as a memory (FIFO memory) on the same address space and by internally providing a control register 62 with a register or the like for setting a base address of each FIFO and the number of stages of FIFO.

(Description of Operation)

Operation of the Example 1 will be described with reference to FIG. 13 to FIG. 16.

Figure 14:
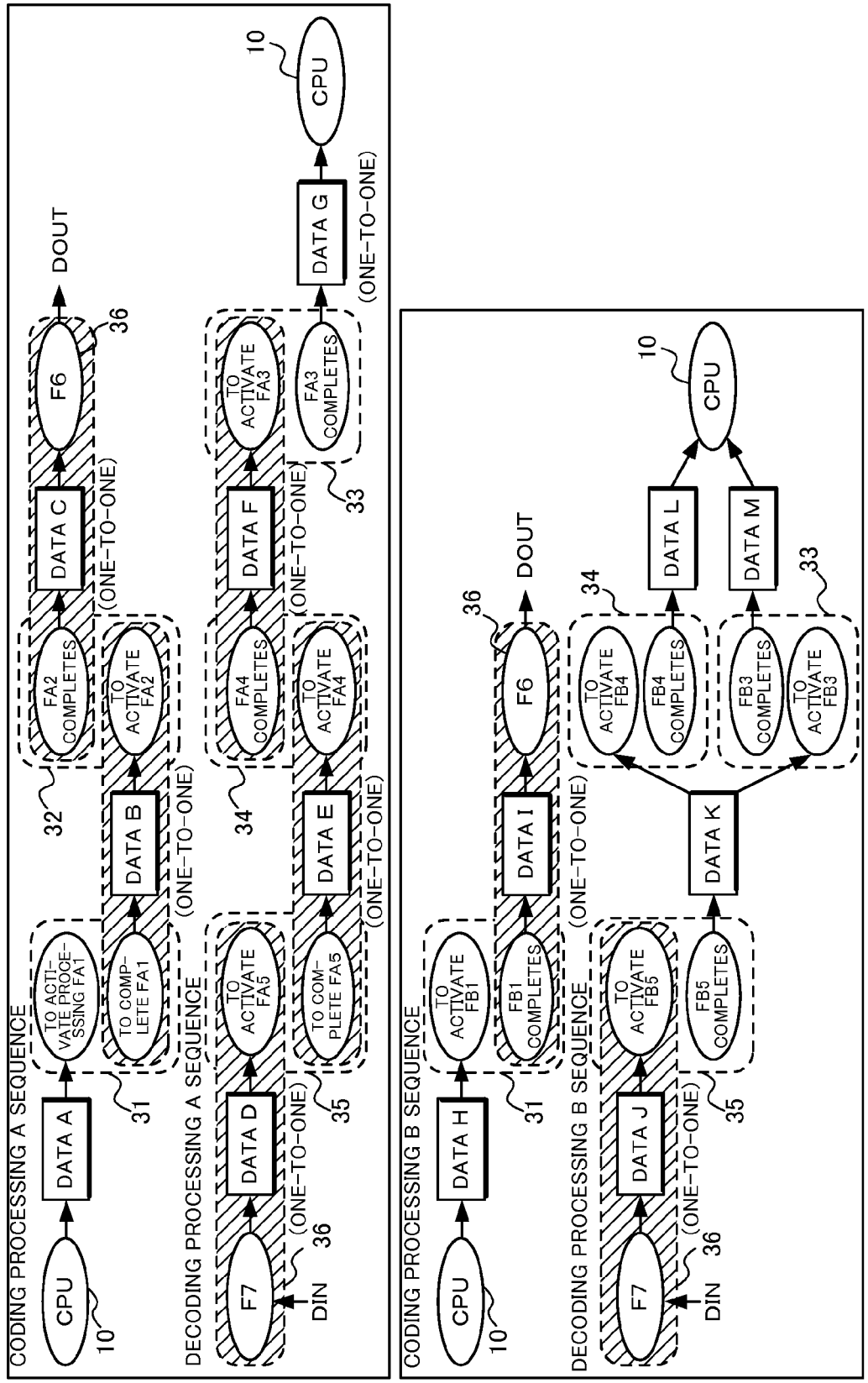
FIG. 14 is a diagram showing an example of an operation sequence in the Example 1 of the present invention.

FIG. 14 is a diagram showing an operation sequence of data coding/decoding processing of each of a coding system A and a coding system B.

In the data coding/decoding processing system for processing the coding system A, in a case of data coding processing, when the main processor (MP(CPU)) 10 issues a command for coding processing A sequence execution to the execution control circuit 20, the execution control circuit 20 analyzes such a coding processing A sequence as shown in FIG. 14 to conduct execution control processing including (A) issuing a coding processing FA1 activation command to the functional block 31 upon reception of a coding processing data A transfer completion status from the main processor (MP(CPU)) 10, (B) issuing a coding processing FA2 activation command to the functional block 32 upon reception of a coding processing FA1 completion status from the functional block 31 and (C) issuing a coding data transfer processing F6 activation command to the functional block 36 upon reception of a coding processing FA2 completion status from the functional block 32.

Storing subsequence coding processing data A from the main processor by such execution control processing as described above makes operation of each functional block be parallel operation in a pipeline-fashion.

At this time, as indicated as "one-to-one" in FIG. 14, one-to-one dependency between sub-processors (functional blocks) holds between, for example, the coding processing FA1 completion status and the coding processing FA2 activation command. Therefore, setting a corresponding processing command at the command table 71 in the status accelerator 25 to set a determination bit in the status data in question to be 1 enables speed-up of execution control processing by the status accelerator 25.

In a case of decoding processing, when the main processor (MP(CPU)) 10 issues a command for decoding processing A sequence execution to the execution control circuit 20, the execution control circuit 20 analyzes such a decoding processing A sequence as shown in FIG. 14 to execute processing including (A) issuing a decoding processing FA5 activation command to the functional block 35 upon reception of an input data transfer processing F7 completion status from the functional block 36 which constantly and cyclically occurs, (B) issuing a decoding processing FA4 activation command to the functional block 34 upon reception of a decoding processing FA5 completion status, (C) issuing a decoding processing FA3 command to the functional block 33 upon reception of a decoding processing FA4 completion status and (D) issuing a decoding data notification interrupt to the main processor (MP(CPU)) 10 upon reception of a decoding processing FA3 completion status.

Constant and cyclic transfer of decoding processing data D by such execution control processing as described above results in making operation of each functional block be parallel operation in a pipeline fashion. Also at the time of decoding processing, since one-to-one dependency between sub-processors (functional blocks) similarly holds between, for example, the decoding processing FA5 completion status and the coding processing FA4 activation command indicated as "one-to-one" in FIG. 14, speed-up of the execution control processing by the status accelerator 25 is possible.

Also when the system operates as a data coding/decoding system for another coding system B, basic execution control operation is the same as that of a case of the data coding/decoding system A. At this time, the respective sub-processors (functional blocks) 31 to 35, which are adapted to either processing of the coding system A (FA1, FA2, FA3, FA4, FA5) and the coding system B (FB1, FB2, FB3, FB4, FB5), select and execute processing by a processing command (processing ID) indicated by the execution control circuit 20. Operation sequences to be registered in the execution control circuit 20 are implemented for both the coding system A and the coding system B.

Switching of processing of the entire system from the coding system A processing to the coding system B processing, or from the coding system B processing to the coding system A processing, can be realized with ease by executing an operation sequence for a relevant coding system by the main processor (MP (CPU)) 10 (command issuance to the execution control circuit 20).

Also with respect to speed-up processing of a simple processing status having one-to-one dependency with a processing command to be issued next, it is possible to flexibly cope with a plurality of operation sequences by setting as many values as the number of the plurality of operation sequences in advance at the command table 71 in the status accelerator 25, or rewriting a value of the command table 71 as well at the timing of switching of the coding system.

In the structure shown in FIG. 13, the shared memory 60 is used for transfer between the main processor (MP (CPU)) 10 and the sub-processors 31 to 36, and between different sub-processors.

In this case, the need of a direct communication unit is eliminated between different sub-processors, and writing a processing parameter necessary for processing or the like into the shared memory 60 enables activation control by common control of issuing only a shared memory address (data pointer) at which processing contents (processing ID) and a parameter for the processing as required are stored, and an activation command from the execution control circuit 20 to all the sub-processors 31 to 36. Another great advantage is that use of the shared memory 60 for data transfer between the execution control circuit 20 as a feature of the present invention and a different sub-processor makes it possible to flexibly cope with such a plurality of operation sequences whose processing order (execution order) of each sub-processor (functional block) is different as shown in FIG. 14.

(Description of Operation for Sharing FIFO)

Figure 15:
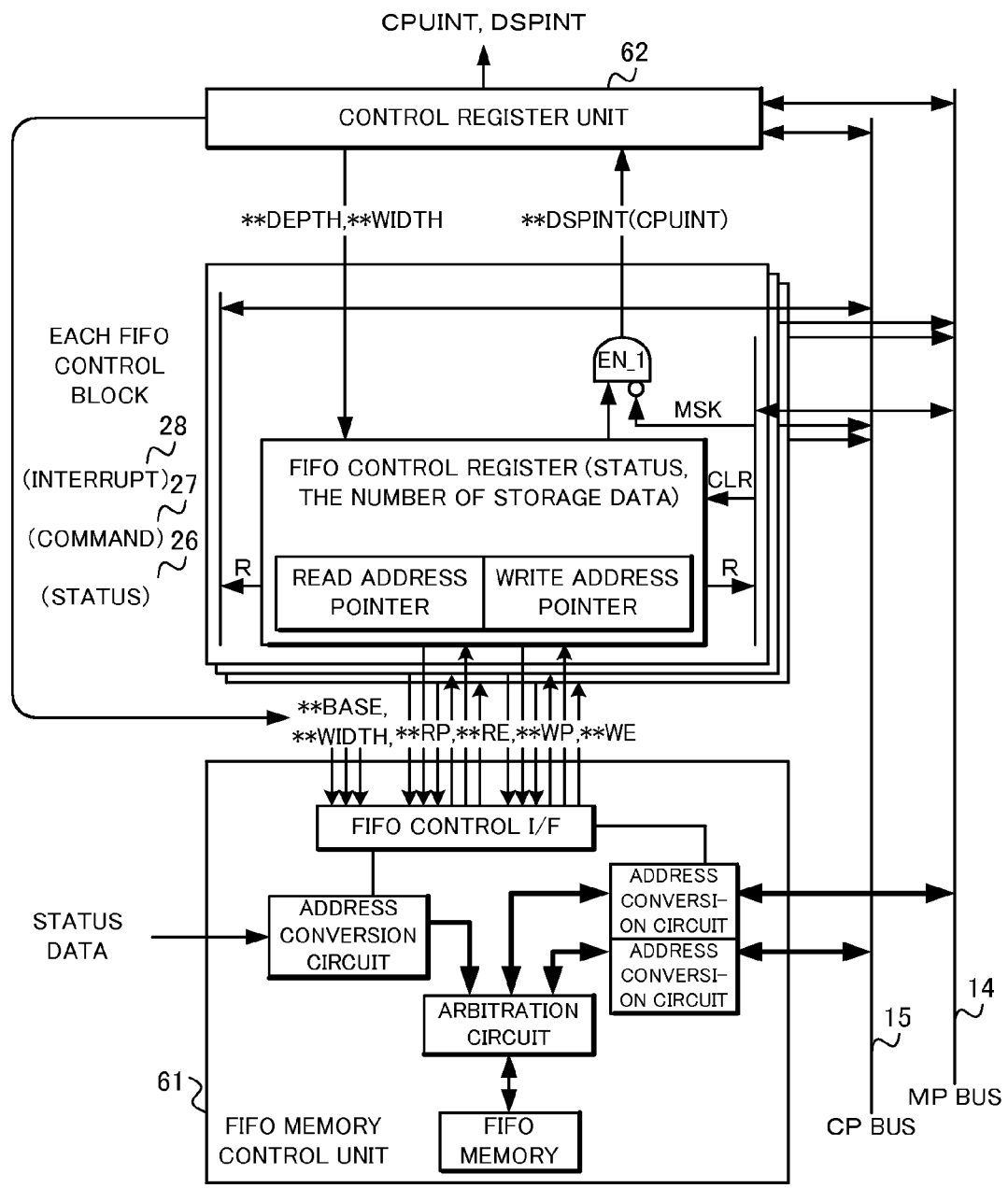
FIG. 15 is a diagram showing a FIFO control circuit configuration in the present invention.

Operation for sharing FIFO will be described with reference to FIG. 15 and FIG. 16. FIG. 15 is a diagram showing an exemplary structure for sharing FIFO.

While the logical block structure is shown in FIG. 1 such that for the CP bus 15 and the MP bus 14, and the status bus 52 to access their FIFOs, they make a direct access to the interrupt FIFO control unit 28, the status FIFO control unit 26 and the command FIFO control unit 27, in a case of sharing FIFO, an access will be made to a FIFO memory control unit 61 as shown in FIG. 15.

The status FIFO control unit 26, the command FIFO control unit 27 and the interrupt FIFO control unit 28 have no entity as FIFO therein and control a write pointer (WP), a read pointer (RP), the number of storage data (NUM) and the like of each FIFO.

Accordingly, the status FIFO control unit 26, the command FIFO control unit 27 and the interrupt FIFO control unit 28 each comprise a write pointer register, a read pointer register, a number of storage data register, a status register indicative of a Full/Empty flag, a clear register (CLR) for clearing FIFO, a mask register (MSK) for masking an interrupt to the main processor (MP(CPU)) 10 or the execution control processor (CP) 21 which is caused when write to FIFO occurs, and the like.

A control register unit 62 comprises, as setting registers for sharing FIFO, as many base address registers (BASE), number of stages registers (DEPTH), data bit width registers (WIDTH) and the like as the number of FIFOs.

The FIFO memory control unit 61 comprises a FIFO memory (FIFO RAM) as an entity of each FIFO, and comprises for FIFO accesses from the CP bus 15, the MP bus 14 and the status bus via the determination circuit 24, respectively, address conversion circuits (Address Conv.) which execute address conversion of a memory access by using each FIFO base address (BASE) from the control register 62, and each write address pointer (WP) and each read address pointer (RP) from the status FIFO control unit 26, the command FIFO control unit 27 and the interrupt FIFO control unit 28.

Operation of each FIFO control unit such as the status FIFO control unit 26, the command FIFO control unit 27 and the interrupt FIFO control unit 28 will be described with reference to FIG. 15.

The FIFO control units 26, 27 and 28 each control a write address pointer (WP), a read address pointer (RP), the number of storage data (NUM) and the like of each FIFO by using each FIFO number of stages signal (DEPTH) and each FIFO data bit width signal (WIDTH) from the control register unit 62, and a write enable signal (WE) and a read enable signal (RE) of each FIFO from the FIFO memory control unit 61. In addition to those, such functions can be provided without involving problems as a FIFO status register function, a FIFO clearing function and an interrupt masking function.

Figure 16:
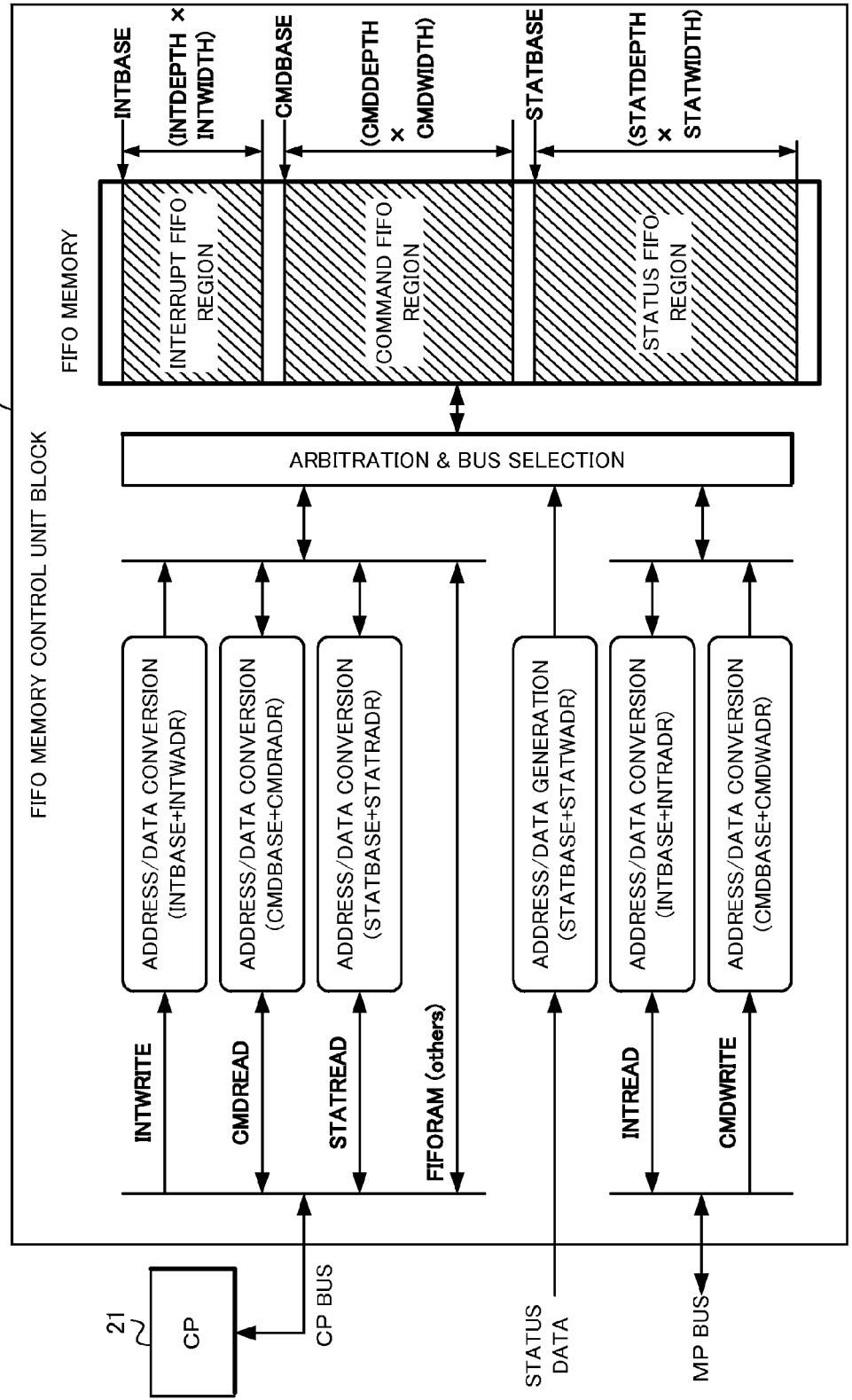
FIG. 16 is a diagram showing a bus control structure of a FIFO memory control unit in the present invention.

FIG. 16 is a diagram showing bus control of the FIFO memory control unit 61. Implementation of each FIFO such as the status FIFO control unit 26, the command FIFO control unit 27 and the interrupt FIFO control unit 28 uses one memory (FIFO memory), and each FIFO region and the number of stages of each FIFO can be set to be variable by using the base address register (BASE) and the FIFO number of stages register (DEPTH).

When writing data to each FIFO and when reading data from each FIFO, make an access by using addresses of dedicated "interrupt FIFO write address region (INTWRITE)", "interrupt FIFO read address region (INTREAD)", "status FIFO read address region (STATREAD), "command FIFO write address region (CMDWRITE)", "command FIFO read address region (CMDREAD)" and the like. When these regions are accessed, execute processing of converting an address to an actual FIFO memory by using values of a base address (BASE), a write address pointer (WADR(WP)) and a read address pointer (RADR(RP)) of the respective FIFOs.

The FIFO memory control unit 61 shown in FIG. 16, which uses one FIFO memory (FIFO RAM) for implementing each FIFO, also arbitrates contention of accesses from the CP bus 15, the MP bus 14 and the status bus 52.

Particularly executed is hardware access arbitration without using an access control register or the like, for which such arbitration method is employed as the "round robin system" or "fixed priority system whose priority order is MP bus 14>CP bus 15>status bus".

Thus, the control register unit 62 being provided with the base address register (BASE), the number of stages setting register (DEPTH) and the data bit width register (WIDTH) of each FIFO, each of the FIFO control units 25, 26 and 27 being provided with such a function of controlling a write/read pointer and the number of storage data, and the FIFO memory control unit 61 being provided with a function of converting an address of each FIFO access, enable each FIFO (status FIFO, command FIFO, interrupt FIFO), to be shared and also enable the number of stages of each FIFO and a data bit width to be variable. As a result, an execution control circuit 20 can be realized whose expandability and flexibility are extremely high. The command table 71 in the status accelerator 25 can be shared as well by using the same memory as that of each FIFO without involving problems.

As described in the foregoing, according to the present invention, with processing statuses from the respective sub-processors classified into a simple processing status having one-to-one dependency with a processing command to be issued next and other ordinary processing statuses, providing the determination circuit (status decoder) in the execution control circuit enables determination of under which status a notified processing status falls.

Then, in a case of a simple processing status having one-to-one dependency, provision of the status accelerator in the execution control circuit enables automatic issuance of a corresponding processing command by table look-up by a dedicated circuit.

Accordingly, dedicated hardware processing is enabled depending on whether it is a simple processing status or not, thereby remarkably speeding up the processing as compared with software processing using an execution control processor. Since such ordinary execution control processing in which three or more processings dependent on each other as issuing one processing command involving two or more processing statuses allows a processing status in question to be transferred to a status FIFO by using the determination circuit, the processing can be realized by software processing by means of the execution control processor, which also realizes high flexibility at the same time.

In addition, since hardware execution control processing using the status accelerator and software execution control processing by the status FIFO and the execution control processor (CP) 21 can be executed in parallel, resultant load distribution leads to speed up of the processing.

Command table for issuing a command in the status accelerator, because it is structured to be set by the execution control processor (CP) 21 or the main processor (MP(CPU)) 10, has an advantage of enabling the table to be changed or expanded with ease by specification change or the like after LSI development and also because its structure is independent of the number of sub-processors to which an interface of the execution control circuit is connected and the number of processing statuses, has an advantage of extremely high flexibility and expandability as well as an increase in speed.

(Effects of the First Exemplary Embodiment)

Next, effects of the present exemplary embodiment will be described. The present exemplary embodiment expects the following effects.

First effect is enhancing speed-up and further load distribution of each sub-processor execution controlling function whose loads are decentralized (offloading) from the main processor to the execution control circuit in the multiprocessor system.

The reason is that with the execution control circuit provided for controlling parallel execution of the respective sub-processors, in an operation sequence which defines an execution order of the sub-processors, execution control processing of an operation sequence in which a processing status and a processing command to be issued next are one-to-one dependent on each other between the respective sub-processors can be realized not as software processing by the execution control processor but as hardware processing by the status accelerator.

While the related art often involves decreases in flexibility and expandability caused by realization of processing as hardware processing, the present invention realizes speed-up of execution control processing while maintaining high flexibility and expandability of the system as a whole as will be described later as second and third effects, which is the largest effect of the present invention.

When realizing execution control processing in software by means of the execution control processor, all the processing from read of status data from the status FIFO, identification and analysis of a relevant operation sequence to issuance of a processing command is realized by the processor processing, so that the number of processing cycles (latency) is assumed to be in the order from several tens of cycles to several hundred of cycles. On the other hand, when realizing the execution control processing by hardware processing by means of the status accelerator, all the processing from determination by the determination circuit, table look-up at the status accelerator to issuance of a processing command is realized by hardware, so that the processing can be realized by the number of processing cycles (latency) in the order of several cycles (10 cycles or less). In other words, hardware processing can be realized several times to more than ten times as fast as software processing using the execution control processor.

Moreover, in an actual data processing system having the respective sub-processors to be processed in parallel in a pipeline fashion as shown in the Example 1 (the exemplary operation sequence shown in FIG. 14), it is highly likely that a processing status and a processing command to be issued next are one-to-one dependent on each other between the respective sub-processors, so that the possibility of obtaining a speed-up effect will be accordingly increased.

In addition, since software processing by the execution control processor and hardware processing by the status accelerator are operable in parallel, causing the status accelerator to conduct execution control processing which is required as many as the number of simple processing statuses and is assumed to be processed by the execution control processor also enables processing loads of the execution control processor to be balanced.

This leads to drastic reduction in the risk of a processing failure of the execution control processor as compared with the related art which realizes all the execution control processing by an execution control processor.

Second effect is providing a highly flexible multiprocessor system comprising an execution control circuit. In particular, speed-up of execution control processing of an operation sequence in which a processing status and a processing command to be issued next are one-to-one dependent on each other between the respective sub-processors can be realized only by addition of a simple hardware circuit while maintaining high flexibility.

The reason is that in the structure of the execution control circuit of the present invention, when as to execution control processing between the respective sub-processors, its processing status and a processing command to be issued next are one-to-one dependent on each other, it is possible to flexibly select for each processing status whether the processing is to be executed at a high speed by hardware by using the status accelerator realized by simple table look-up or the processing is to be flexibly executed in software by using the status FIFO whose number of stages are variable and the execution control processor, for example, according to a processing load of the execution control processor, a capacity of the command table or the like.

In particular, limiting execution control processing whose speed is to be increased to an operation sequence in which a processing status and a processing command to be issued next are one-to-one dependent on each other between the respective sub-processors enables speed-up of the processing while maintaining flexibility not by a complicated dedicated hardware configuration but only by the addition of a hardware circuit (the determination circuit and the status accelerator) which executes relatively simple and flexible table look-up.

In other words, a distinct feature is that speed-up of execution control processing in the execution control circuit of the present invention cannot be realized with ease only by a combination of such a highly flexible execution control circuit as shown in Patent Literature 2 and a simple determination circuit, but can be realized by finding a property in an operation sequence in which a processing status and a processing command to be issued next are one-to-one dependent on each other and making the best of the same as a reference (point of determination) for determining whether speed-up of the processing is possible as shown in FIG. 3, FIG. 4 and FIG. 14.

It is also shown that using a data format having a determination bit provided in status data realizes a determination function in the determination circuit with a relatively simple comparison determination circuit.

In this case, while it is necessary to change a status data value on the sub-processor side according to whether execution control processing of a processing status in question is to be realized in hardware by means of the status accelerator or whether the same is to be realized in software by means of the execution control processor, the determination circuit can be advantageously realized with an extremely simple structure.

A further advantage is that sharing the status FIFO, the command FIFO and the interrupt FIFO in the execution control circuit on the same memory as described in detail in the Example 1 enables flexible adjustment of the number of stages of each FIFO and the like according to an operation sequence or the amount of processing of the execution control processor after LSI development.

Third effect is provision of a multiprocessor system which comprises an execution control circuit and whose expandability is high. In particular, speed-up of execution control processing of an operation sequence in which a processing status and a processing command to be issued next are one-to-one dependent on each other between the respective sub-processors can be realized while maintaining high expandability.

The reason is that in the present invention, as the structure of the execution control circuit, realizing processing of a status notification from each sub-processor by using such a format of status data shown in FIG. 10 and the status FIFO whose number of stages is variable and by realizing the status accelerator as a dedicated hardware configuration by the use of a command table whose setting is changeable enables the system to cope with an increase in the number of sub-processors, the number of processing status, or the like without changing a hardware configuration of the execution control circuit.

In a case of expanding such a processing status as has one-to-one dependency with a processing command to be issued next, in particular, since it can be processed by the status accelerator having a small number of processing cycles, expansion is possible only by changing setting of the command table in the status accelerator or the like without affecting an entire processing latency or a processing load of the execution control processor.

Since hardware of the execution control circuit is basically formed only of the execution control processor, FIFO for each interface and a simple hardware circuit (the determination circuit and the status accelerator) added for speeding up the status processing, and the number of stages of each of the command FIFO and the interrupt FIFO as the interfaces on the main processor side can be set by sharing with other FIFOs, the execution control circuit of the present invention is highly likely to be diverted to various multiprocessors for application.

(Second Exemplary Embodiment)

Next, a second exemplary embodiment of the present invention will be described in detail with reference to the drawings. In the following drawings, no description will be made of a structure of a part not related to a gist of the present invention and no illustration will be made thereof.

In the present exemplary embodiment, detailed description will be made of a case where a content addressable memory (CAM) is used for status determination in the determination circuit of the execution control circuit.

Figure 17:
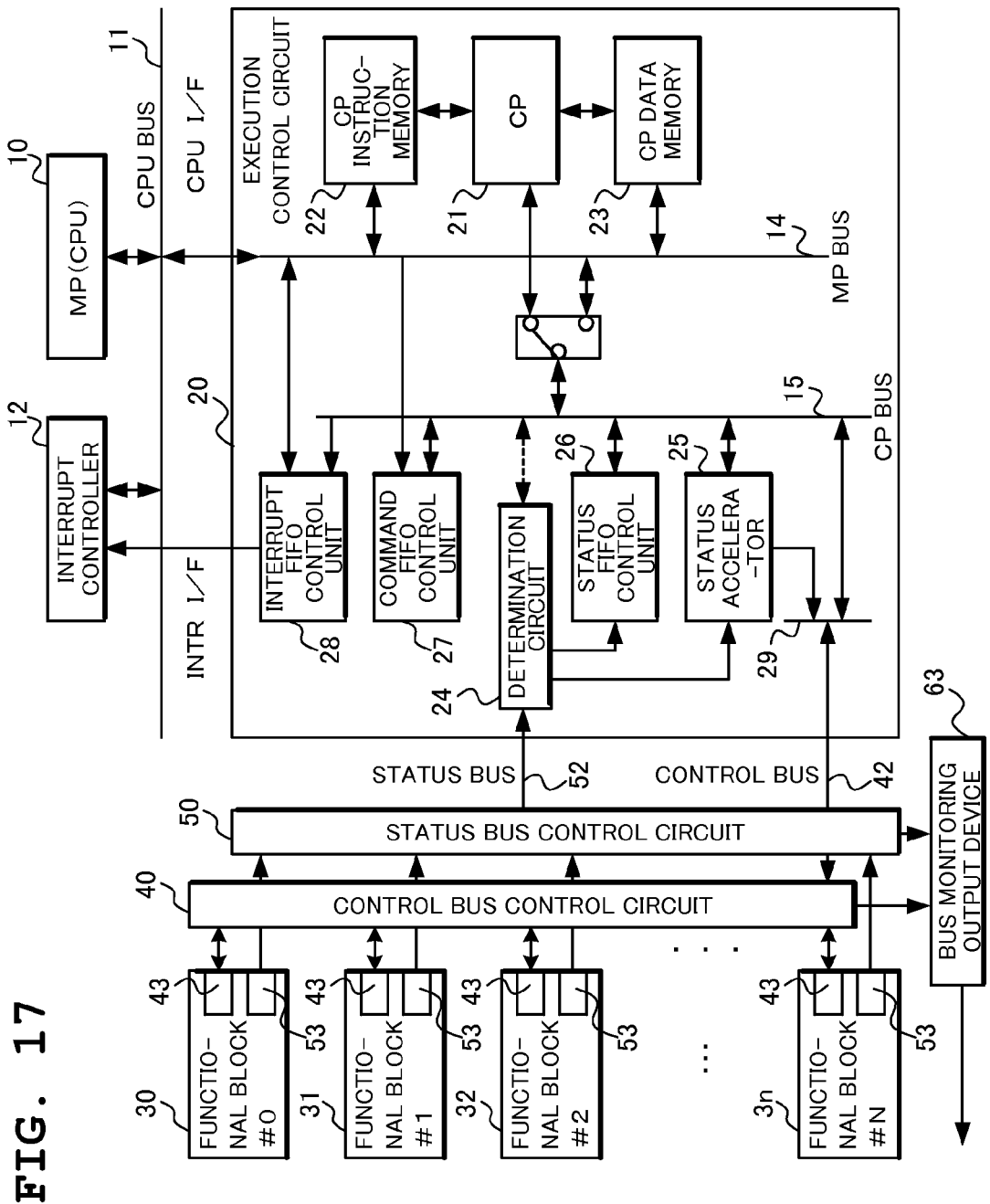
FIG. 17 is a diagram showing a structure of a multiprocessor in a second exemplary embodiment of the present invention.

FIG. 17 is a diagram showing an exemplary structure of a multiprocessor system using a content addressable memory (CAM) for status determination in the determination circuit of the execution control circuit, which memory is the second exemplary embodiment of the present invention.

Similarly to the first exemplary embodiment, the multiprocessor system of the present invention is premised on including the main processor (MP(CPU)) 10, its CPU bus 11 and the interrupt controller 12 as a peripheral block on the main processor side, and the respective sub-processors (functional blocks) 30 to 3*n* on the side of the sub-processors. The main processor (MP (CPU)) 10 executes execution control on the sub-processor side by using the CPU bus 11 and checks a state on the sub-processor side by using an interrupt signal input to the interrupt controller 12. The execution control circuit 20 as the present invention is implemented between the main processor (MP (CPU)) 10 and the sub-processors (functional blocks) 30 to 3*n*, and the execution control circuit 20 comprises the same interfaces as those of the first exemplary embodiment (the CPU I/F, the INTR I/F, the control bus 42 and the status bus 52).

Between the execution control circuit 20 and the respective sub-processors (functional blocks) 30 to 3*n*, provided are the control bus control circuit 40 and the status bus control circuit 50 similarly to the first exemplary embodiment. The respective sub-processors (functional blocks) 30 to 3*n* are each structured similarly to the first exemplary embodiment to include the command reception control unit 43 and the status notification control unit 53.

Structure of the execution control circuit 20 characteristic of the second exemplary embodiment is a content addressable memory (hash table) provided in the determination circuit 24 so as to enable determination whether a processing status has one-to-one dependency with a processing command to be issued next without setting a determination bit to a processing status value.

It is further characterized in providing the determination circuit 24 with an access interface from the CP bus 15 so as to enable the contents of the hash table to be set by the execution control processor (CP) 21. The second exemplary embodiment is also assumed to comprise a bus monitoring output circuit 63 for observing an access state of the control bus 42 and the status bus 52 from the outside of the LSI.

(Description of Operation of the Second Exemplary Embodiment)

Next, operation of the present exemplary embodiment will be detailed with reference to FIG. 17 to FIG. 19.

Basic operation of the execution control circuit 20, that is, the operation flow shown in FIG. 2, the operation sequences shown in FIG. 3 and FIG. 4 and the operation images shown in FIG. 5 through FIG. 9 are the same as those of the first exemplary embodiment, and with the content addressable memory (hash table) provided in the determination circuit 24, operation characteristic of the second exemplary embodiment is executing determination whether a processing status notified from each of the sub-processors (functional blocks) 30 to 3*n* has one-to-one dependency with a processing command to be issued next by using the content addressable memory (hash table). Setting a determination bit in status data as in the first exemplary embodiment is as a result unnecessary.

Figure 18:
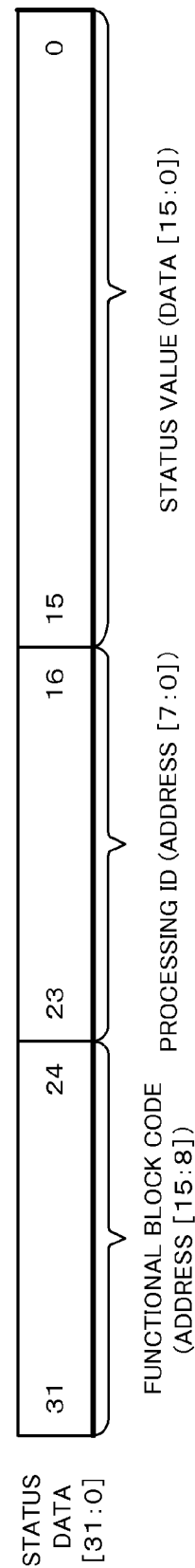
FIG. 18 is a diagram showing a format of status data in the second exemplary embodiment of the present invention.

FIG. 18 is a diagram showing an example of a data format of status data in the second exemplary embodiment.

Basic structure of the status data in the present exemplary embodiment is the same as that of the data format in the first exemplary embodiment shown in FIG. 10 with the only difference that a determination bit is unnecessary which indicates whether it is a simple processing status having one-to-one dependency with a processing command to be issued next or not.

In a case of a simple processing status, at the time of looking up a processing status value or a part of its bits in the table at the status accelerator 25, the data will not be used as an address, so that as compared with the format of the first exemplary embodiment shown in FIG. 10, a processing status value can be more flexibly assigned to each of the sub-processors (functional blocks) 30 to 3n in the second exemplary embodiment.

More specifically, the selection between hardware processing by the status accelerator 25 and software processing by the execution control processor (CP) 21 requires no change of status data notified from each sub-processor, which produces an advantage that the selection can be realized flexibly only by changing table setting in the execution control circuit such as setting of the content addressable memory (hash table) in the determination circuit or the command table 71 in the status accelerator 25.

Figure 19:
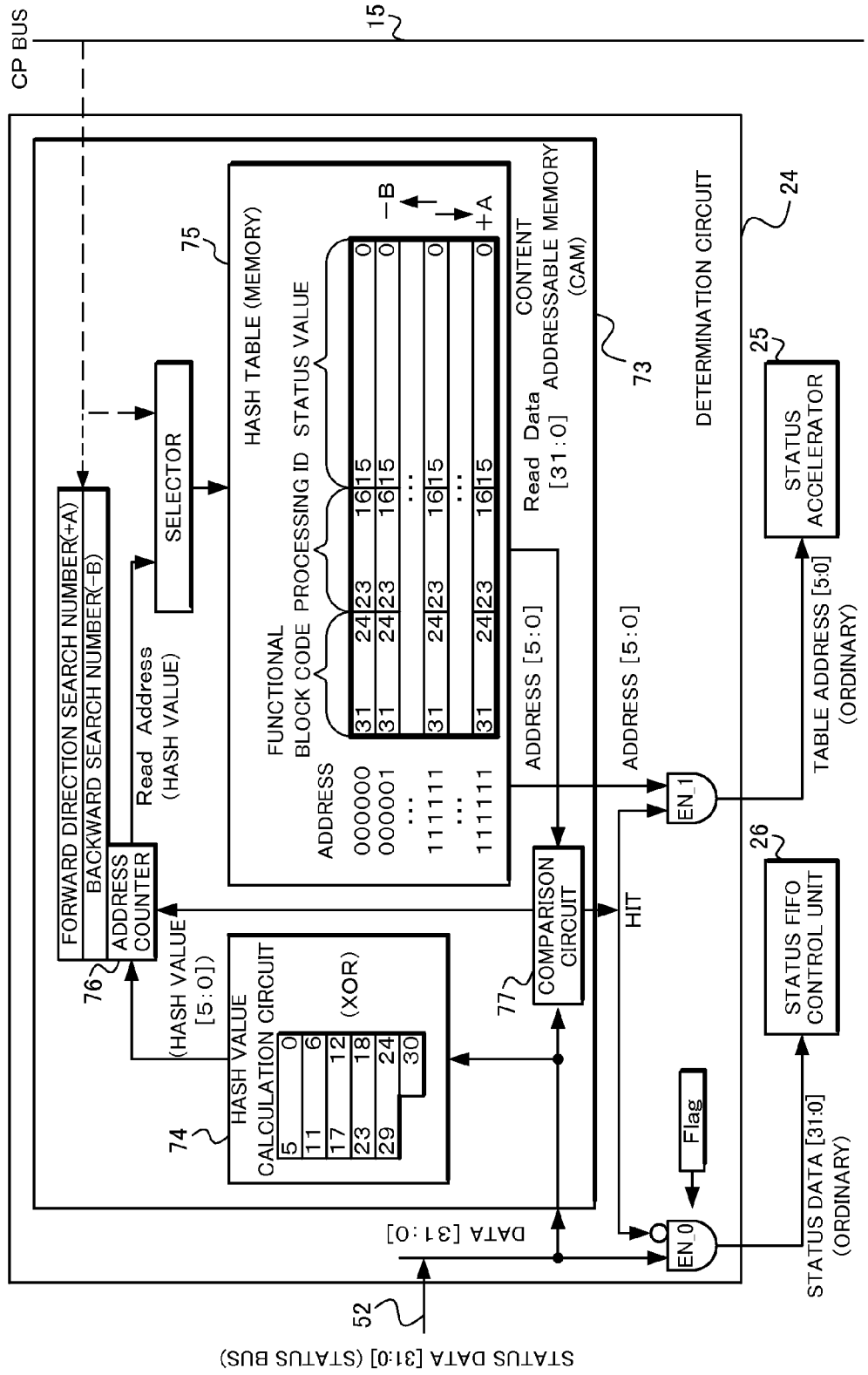
FIG. 19 is a diagram showing a structure of a determination circuit in the second exemplary embodiment of the present invention.

FIG. 19 is a diagram showing an exemplary structure of the determination circuit 24 in the present exemplary embodiment. The determination circuit 24 in the second exemplary embodiment determines by using a content addressable memory (CAM) 73 provided in the circuit whether a processing status notified from each of the sub-processors (functional blocks) 30 to 3n has one-to-one dependency with a processing command to be issued next.

With notified status data [31:0] as data, the determination circuit 24 accesses the content addressable memory (CAM) 73 and when the data hits (in a case of a simple processing status), transfers its address of the data to be output to the status accelerator 25, so that the status accelerator 25 executes table look-up in the command table 71 by using the address, thereby executing high-speed execution control processing by hardware.

On the other hand, when the data fails to hit in the content addressable memory (CAM) 73 (in a case of an ordinary processing status), the input status data is transferred to the status FIFO control unit 26 without modification to execute execution control processing of the status in question by software processing by means of the execution control processor (CP) 21.

At the time of initial operation such as booting operation, the execution control processor (CP) 21 here sets, in the content addressable memory (CAM) 73 in the determination circuit 24 shown in FIG. 19 and the command table 71 in the status accelerator 25 shown in FIG. 12, a status data value and a processing command value to be processed at a high speed which have one-to-one dependency with each other between the sub-processors at the same address of the respective memories in pairs by using the CP bus 15. When a plurality of values exist, they can be set by changing an address.

The content addressable memory (CAM) 73, because of its feature that upon input of data, its address is output, should be basically all searched at once. It is accordingly difficult in general to prepare a content addressable memory (CAM) 73 accessible at a high speed.

The present exemplary embodiment is accordingly characterized in using a hash table (memory) 75 and an address counter 76 whose search range is limitable to realize a content addressable memory (CAM) 73 accessible at a relatively high speed.

First, when status data is notified from the status bus 52, obtain a hash value by using, for example, a hush function (hash value calculation circuit) 74 for calculating an exclusive OR (XOR) for each bit.

Next, with the hash value as a reference address, the address counter 76 accesses the hash table (memory) 75 to determine whether the input status data coincides with the obtained value by means of a comparison circuit 77.

When the value coincides with the data, with the access address as an output address of the content addressable memory (CAM) 73, transfer the value to the status accelerator 25 as a simple processing status having one-to-one dependency with a next processing command.

When the value fails to coincide with the data, using setting values of "forward direction search number A" and "backward direction search number B" which are set in advance by the execution control processor (CP) 21, the address counter 76 sequentially accesses the hash table (memory) 75 from "reference address" to "reference address+A" and from "reference address−1" to "reference address−B" to execute another search and another determination.

When failing to coincide with the data over the range from −B to +A, which means an ordinary processing status not having one-to-one dependency with a next processing command, transfer the relevant status data to the status FIFO control unit 26.

Here, the execution control processor (CP) 21 calculates a hash value in advance with respect to simple status data having one-to-one dependency with a next processing command and sets the status data in question at the hash table 75 with the hash value as an address.

At the command table 71 in the status accelerator 25, set a corresponding processing command at the same address. When a plurality of pieces of status data have the same hash value, with the hash value as a reference, set the data at a free address before or behind the hash value.

In this case, set a value at the control registers of the above "forward direction search number A" and "backward direction search number B" so as to enable search up to the position of the status data in question.

Thus providing the determination circuit 24 in the present exemplary embodiment with the simple hash calculation circuit 74 and hash table (memory) 75 and the address counter 76 whose search range is limitable enables the content addressable memory (CAM) 73 accessible at a high speed to be realized by a relatively simple circuit configuration.

Moreover, as a feature peculiar to the hash table (memory) 75 of the present invention, not all the target data need to be stored, which produces an advantage of selection of such a flexible structure as causing the execution control processor (CP) 21 to process simple status data whose speed-up priority of is relatively low via the status FIFO control unit 26 according to a processing load of the determination circuit 24 or the status accelerator 25 without storing the data in the hash table 75.

The second exemplary embodiment shown in FIG. 17 also has a bus monitoring function.

By the bus monitoring output circuit 63, monitoring-output of only two kinds of single layer bus accesses to the outside of the LSI, the control bus 42 for issuing such a command as processing start to each of the sub-processors (functional blocks) 30 to 3n from the execution control circuit 20 and the status bus 52 for notifying processing completion or an error from each of the sub-processors (functional blocks) 30 to 3n to the execution control circuit 20 enables observation of almost all the states (start, end, etc.) related to processing execution of each sub-processor with relative ease.

Thus, relatively excellent observation facility (debugging facility) is obtained because not a dedicated line or a dedicated bus from each sub-processor but the status bus 52 and the status bus control circuit 50 as the features of the present invention are used for status notification to realize all the communication between the execution control circuit 20 and the sub-processors (functional blocks) 30 to 3n by a shared bus.

(Effects of the Second Exemplary Embodiment)

Next, effects of the present exemplary embodiment will be described.

According to the present exemplary embodiment, while realizing the determination function of the determination circuit by a flexible content addressable memory (hash table) necessitates a little more complicated and larger scale hardware than that of the first exemplary embodiment, for the selection between hardware processing by the status accelerator and software processing by the execution control processor, no change of status data notified by each sub-processor is required but only change of table setting in the execution control circuit is required such as the content addressable memory (hash table) in the determination circuit and the command table in the status accelerator, which realizes selection more flexibly.

According to the present exemplary embodiment, provision of the bus monitoring output device realizes a multiprocessor system having excellent debugging facility and observability.

The reason is that since an interface between the execution control circuit and each of the sub-processors is structured only by the control bus and the status bus to transfer processing contents (processing ID), a processing activation command and the like to each sub-processor by means of the control bus and transfer a status notification such as processing completion from each sub-processor by means of the status bus, bus monitoring-output of only the two kinds of buses enables observation of almost all the states (start, end, etc.) related to processing execution of each sub-processor with relative ease.

In particular, by realizing a unit for notifying a status from each sub-processor not by a dedicated line or a dedicated bus whose observability is low but by a status bus whose observability is high, all the communication between the execution control circuit and each sub-processor can be observed only on the two kinds of single layer buses.

In addition, as shown in the Example 1 of the first exemplary embodiment, when realizing data transfer between the sub-processors by using a shared memory, selecting a shared memory bus to be observed and monitoring-outputting data to the outside of LSI also enables observation of data transfer between the sub-processors as well.

(Third Exemplary Embodiment)

Figure 20:
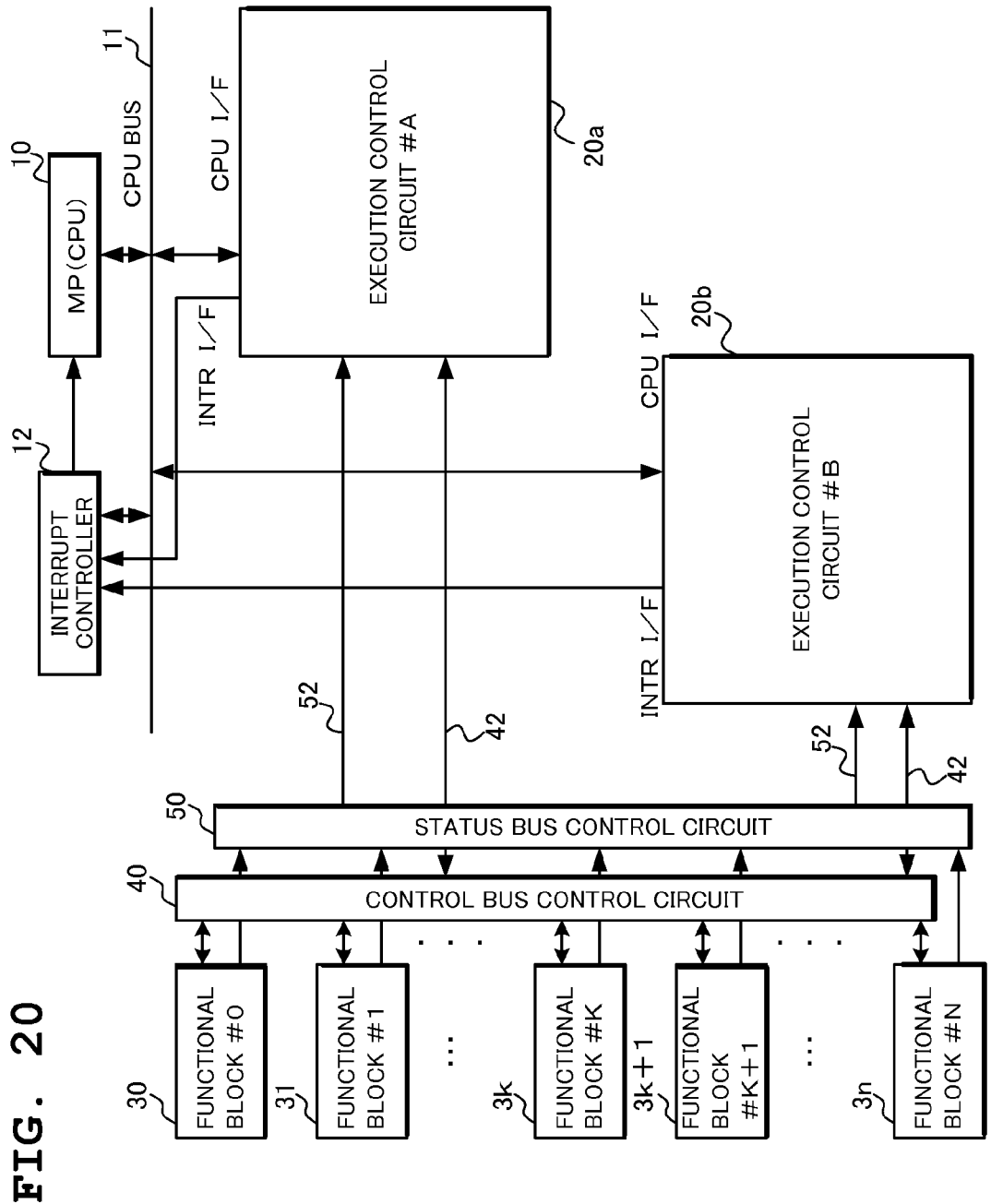
FIG. 20 is a diagram showing a structure of a multiprocessor in a third exemplary embodiment of the present invention.

Third exemplary embodiment of the present invention will be described in detail with reference to FIG. 20. In FIG. 20, no description is made of a structure of a part not related to a gist of the present invention and no illustration is made thereof.

The present exemplary embodiment will be detailed with respect to a system comprising a plurality of execution control circuits to realize execution control processing of the sub-processors in parallel.

FIG. 20 is a diagram showing an exemplary structure of a multiprocessor system comprising a plurality of execution control circuits 20 as the present exemplary embodiment to realize parallel execution of execution control processing of the sub-processors.

Similarly to the first and second exemplary embodiments, the multiprocessor system of the present invention is assumed to include the main processor (MP(CPU)) 10 and its CPU bus 11 on the main processor side, and the interrupt controller 12 as a peripheral block on the side of the main processor, and the respective sub-processors (functional blocks) 30 to 3$n$ on the side of the sub-processors. The main processor (MP(CPU)) 10 conducts execution control on the sub-processor side by means of the CPU bus 11 to check a state of the sub-processor side by using an interrupt signal input to the interrupt controller 12.

As a structure characteristic of the third exemplary embodiment, a plurality (20$a$, 20$b$) of execution control circuits 20 as the present invention are implemented between the main processor (MP(CPU)) 10 and the sub-processors (functional blocks) 30 to 3$n$ to cause execution control processing to be executed in parallel.

The execution control circuits 20$a$, 20$b$ and the interfaces can be realized by the same hardware configuration and the interfaces (CPU I/F, INTR I/F, the control bus 42, the status bus 52) as those of the execution control circuit 20 of the first and second exemplary embodiments.

Between the execution control circuits 20$a$, 20$b$ and the each of the sub-processors (functional blocks) 30 to 3$n$, the control bus control circuit 40 and the status bus control circuit 50 are provided.

The control bus control circuit 40 and the status bus control circuit 50 may be each one provided and shared by the two execution control circuits 20$a$ and 20$b$ as shown in FIG. 20 or the control bus control circuit 40 and the status bus control circuit 50 may be provided for each of the plurality of execution control circuits without involving problems.

While shown in FIG. 20 is a system having two execution control circuits 20, three or more execution control circuits may be operated in parallel to involve no problem. Only the interrupt controller 12 on the main processor side has its number of input interrupt signals changed depending on the number of implemented execution control circuits 20 but the other blocks become applicable by the change of the bus control circuits whose structure change is relatively easy (the CPU bus 11, the control bus control circuit 40, the status bus control circuit 50). In other word, no change of the internal structure of the execution control circuit 20 and the interfaces is necessary, and change of a processing status whose rate is to be increased by the status accelerator 25 which might be changed depending on the system or change of the number of stages of each FIFO can be coped with by using the rewriting function of the command table 71 or the like and the FIFO sharing function shown in the Example 1 which are the features of the present invention without involving hardware configuration change.

While the main processor (MP(CPU)) 10 is here shown in FIG. 20 singly for convenience' sake, a plurality of main processors (MP(CPU)) may exist without involving a problem similarly to the execution control circuit 20.

(Description of Operation of Third Exemplary Embodiment)

Next, operation of the present exemplary embodiment will be detailed.

With a plurality (two in the example shown in FIG. 20) of execution control circuits provided as the feature of the present invention, operation peculiar to the present exemplary embodiment is parallel operation and load distribution of execution control processing.

Register operation sequences necessary for processing at the execution control circuits 20$a$ and 20$b$ in distribution from the main processor (MP(CPU)) 10 and issue a start command of an operation sequence in question to the execution control circuit at which the operation sequence in question is registered.

Causing each execution control circuit to execute a different operation sequence enables execution control processing to be executed in parallel to realize further load distribution in the system as a whole.

It is also possible to further increase the number of sub-processors according to processing loads of the entire system.

Although operation on the sub-processors (functional blocks) 30 to 3n side is basically the same as those of the first and second exemplary embodiments, with respect to a sub-processor controlled by both of the two execution control circuits 20a and 20b, a processing status should be notified to both the execution control circuits.

On the other hand, with respect to a sub-processor controlled only by one of the execution control circuits, a processing status should be notified only to the relevant execution control circuit. Because of use of the command table 71 whose setting can be changed by the execution control processor (CP) 21 and a status FIFO whose number of stages is variable for execution control processing of a processing status, the execution control circuit 20 of the present invention is capable of flexibly coping with change of a status notification.

When control bus accesses from the two execution control circuits 20a and 20b contend, the control bus control circuit 40 decodes addresses after arbitrating the accesses by the round robin system or the like to realize a control bus access between selected execution control unit and sub-processor.

When status bus accesses from the sub-processors (functional blocks) 30 to 3n contend, the status bus control circuit 50 executes address decoding after arbitrating the accesses by the round robin system or the like to realize a status bus access to an execution control circuit selected by the sub-processor in question.

While a multiprocessor system is expected to have an increased number of sub-processors in the future, provision of a plurality of execution control circuits 20 as in the present exemplary embodiment advantageously prevents a processing failure due to increased loads on execution control processing.

Further advantage is that an increase in the number of the execution control circuits 20 as the present invention can be realized without changing a hardware configuration of the execution control circuit 20 and a hardware configuration on the sub-processor side.

(Effects of the Third Exemplary Embodiment)

Next, effects of the present exemplary embodiment will be described.

As compared with the first exemplary embodiment, the present exemplary embodiment enables further balancing of loads on processing of the execution control processor (CP) or the status accelerator by implementing a plurality of execution control circuits. Although along with a future increase in system scale, the number of sub-processors in LSI is expected to be increased, the present invention, which allows an increase in the number of implemented sub-processors without changing a hardware configuration of the execution control circuit, enables further load distribution while maintaining high expandability.

While the present invention has been described with respect to the preferred exemplary embodiments in the foregoing, such is for illustrative purpose only and it is not to be construed limitative, and can be implemented in modification within the scope of its technical idea.

Arbitrary combination of the foregoing components and conversion of the expressions of the present invention to/from a method, a device, a system, a recording medium, a computer program and the like are also available as a mode of the present invention.

In addition, the various components of the present invention need not always be independent from each other, and a plurality of components may be formed as one member, or one component may be formed by a plurality of members, or a certain component may be a part of other component, or a part of a certain component and a part of other component may overlap with each other, or the like.

While the method and the computer program of the present invention have a plurality of procedures recited in order, the order of recitation is not a limitation to the order of execution of the plurality of procedures. When executing the method and the computer program of the present invention, therefore, the order of execution of the plurality of procedures can be changed without hindering the contents.

The plurality of procedures of the method and the computer program of the present invention are not limitedly executed at timing different from each other. Therefore, during the execution of a certain procedure, other procedure may occur, or a part or all of execution timing of a certain procedure and execution timing of other procedure may overlap with each other, or the like.

The whole or part of the exemplary embodiments disclosed above can be described as, but not limited to, the following supplementary notes.

(Supplementary note 1) A multiprocessor system comprising:

one or a plurality of main processors and a plurality of sub-processors; and an execution control circuit which conducts execution control of each said sub-processors, wherein said execution control circuit comprising an execution control processor for execution control processing of each said sub-processors, a control bus output unit for activation of a command to each said sub-processors, a status bus input unit for status notification from each said sub-processors, a determination circuit which determines whether or not said status notification has one-to-one dependency with a processing command to be issued next on an operation sequence and is to be processed at a high speed, a status accelerator which issues a corresponding processing activation command when the status notification is to be processed at a high speed, and a status FIFO control unit which processes said status notification by using said execution control processor.

(Supplementary note 2) The multiprocessor system according to supplementary note 1, wherein said status accelerator issues a corresponding processing activation command by table look-up when the status notification is to be processed at a high speed.

(Supplementary note 3) The multiprocessor system according to supplementary note 1 or supplementary note 2, wherein said execution control circuit comprises a command arbitration circuit which arbitrates accesses from said execution control processor and said status accelerator.

(Supplementary note 4) The multiprocessor system according to any one of supplementary note 1 through supplementary note 3, wherein said status accelerator comprises a command table which stores a sub-processor ID and a processing ID of a corresponding processing command in pairs, and a command output controller for issuing a corresponding processing command to said sub-processor, wherein said command output controller with all or a part of data transferred from said determination circuit as an address, reads a stored processing command from said command table and to a sub-processor having a read sub-processor ID, issues a processing activation command so as to include a processing ID read together.

(Supplementary note 5) The multiprocessor system according to any one of supplementary note 1 through supplementary note 4, wherein
a bit region for determination is provided in a format of status data for said status notification, and
said determination circuit comprises
a comparison determination circuit which executes determination by using said bit region for determination, and
a transfer selection unit which transfers all or a part of said status data to said status accelerator when the determination is made that the status notification has the one-to-one dependency and is to be processed at a high speed and otherwise transfers said status data to said status FIFO control unit.

(Supplementary note 6) The multiprocessor system according to any one of supplementary note 1 through supplementary note 4, wherein said determination circuit comprises
a content addressable memory which when accessed by using input status data, if a processing command having the one-to-one dependency exists, realizes determination by outputting an address of said command table, and
a transfer selection unit which transfers an address to be output to said status accelerator when the status data hits in said content addressable memory and transfers input said status data to said status FIFO control unit when the data fails to hit.

(Supplementary note 7) The multiprocessor system according to supplementary note 6, wherein said content addressable memory comprises
a hash value calculation circuit for status data,
a hash table which stores, with a hash value calculated from status data having the one-to-one dependency as an address, the status data in question as data, and
an address counter for realizing determination by a minimum number of accesses when a plurality of pieces of status data having the same hash value exist.

(Supplementary note 8) The multiprocessor system according to supplementary note 6 or supplementary note 7, wherein setting of contents of said content addressable memory can be changed by said main processor or said execution control processor.

(Supplementary note 9) The multiprocessor system according to any one of supplementary note 1 through supplementary note 8, wherein said determination circuit comprises a unit which transfers all the status data to said status FIFO control unit according to a value of a control register which can be set by said main processor or said execution control processor irrespective of said determination result.

(Supplementary note 10) The multiprocessor system according to any one of supplementary note 1 through supplementary note 9, comprising:
a control bus control circuit for a control bus which executes control from said execution control circuit to each said sub-processors, and
a status bus control circuit for a status bus which executes status notification from each said sub-processors to said execution control circuit, wherein
said status bus control circuit comprises
a unit which executes status bus transfer to said execution control circuit with a sub-processor ID added to the status data which ID indicates from which of said sub-processors a status notification comes at the time of arbitration of a status bus accesses from each said sub-processors, and
said status FIFO control unit comprises
a mechanism which stores said sub-processor ID, and corresponding processing ID and status value in the lump.

(Supplementary note 11) The multiprocessor system according to any one of supplementary note 1 through supplementary note 10, wherein each said sub-processors comprise
a command reception control unit for obtaining a processing activation command from said control bus, and
a status notification control unit for transmitting a processing status to said status bus, and
notifies a processing ID designated by said processing activation command and a processing status corresponding to the processing ID in combination as status notification data to said status bus.

(Supplementary note 12) The multiprocessor system according to any one of supplementary note 1 through supplementary note 11, wherein said execution control circuit comprises
a command FIFO control unit for setting an operation sequence and inputting a command from the main processor for the communication with the main processor,
an interrupt FIFO control unit for interrupt notification to the main processor such as processing sequence completion,
a FIFO base address setting register and a FIFO number of stages setting register which share entities of said status FIFO control unit, said command FIFO control unit and said interrupt FIFO control unit in a memory on the same address space to make the number of stages of each FIFO be variable, and
an address conversion unit which when an access to each FIFO control unit occurs, converts the access address into an actual memory address by using values of two said FIFO setting registers.

(Supplementary note 13) The multiprocessor system according to any one of supplementary note 1 through supplementary note 12, comprising a shared memory which is multibanked as a data transmission and reception unit between said sub-processors, wherein each said sub-processors comprise a shared memory interface for input/output data transfer to transfer input/output data and obtain a processing parameter through said shared memory interface.

(Supplementary note 14) The multiprocessor system according to any one of supplementary note 1 through supplementary note 13, comprising a bus monitoring output circuit which monitoring-outputs said control bus or said status bus to the outside of LSI.

(Supplementary note 15) The multiprocessor system according to any one of supplementary note 1 through supplementary note 14, comprising said execution control circuit in the plural to conduct execution control processing in parallel.

(Supplementary note 16) A sub-processor execution controlling method in a multiprocessor system comprising one or a plurality of main processors and a plurality of sub-processors, wherein
an execution control circuit which conducts execution control of each said sub-processors is provided,
a determination circuit of said execution control circuit determines whether or not a status notification from each said sub-processors has one-to-one dependency with a processing command to be issued next on an operation sequence and is to be processed at a high speed,
a status accelerator of said execution control circuit issues a corresponding processing activation command when the status notification is to be processed at a high speed, and
a status FIFO control unit of said execution control circuit processes said status notification by using an execution control processor for execution control processing of each said sub-processors.

(Supplementary note 17) The execution control method according to supplementary note 16, wherein said status accelerator issues a corresponding processing activation command by table look-up when the status notification is to be processed at a high speed.

(Supplementary note 18) The execution control method according to supplementary note 16 or supplementary note 17, wherein a command arbitration circuit of said execution control circuit arbitrates accesses from said execution control processor and said status accelerator.

(Supplementary note 19) The execution control method according to any one of supplementary note 16 through supplementary note 18, wherein said status accelerator comprises a command table which stores a sub-processor ID and a processing ID of a corresponding processing command in pairs, and a command output controller for issuing a corresponding processing command to each said sub-processors, wherein with all or a part of data transferred from said determination circuit as an address, said command output controller reading a stored processing command from said command table and to a sub-processor having a read sub-processor ID, issuing a processing activation command so as to include a processing ID read together.

(Supplementary note 20) The execution control method according to any one of supplementary note 16 through supplementary note 19, wherein a bit region for determination is provided in a format of status data for said status notification, and said determination circuit makes determination by using said bit region for determination, and transfers all or a part of said status data to said status accelerator when the determination is made that the status notification has the one-to-one dependency and is to be processed at a high speed and otherwise transfers said status data to said status FIFO control unit.

(Supplementary note 21) The execution control method according to any one of supplementary note 16 through supplementary note 19, wherein said determination circuit when accessing by using input status data, if a processing command having the one-to-one dependency exists, realizes determination by outputting an address of said command table by means of a content addressable memory, and transfers an address to be output to said status accelerator when the status data hits in said content addressable memory and transfers input said status data to said status FIFO control unit when the data fails to hit.

(Supplementary note 22) The execution control method according to any one of supplementary note 16 through supplementary note 21, wherein said determination circuit transfers all the status data to said status FIFO control unit according to a value of a control register which can be set by said main processor or said execution control processor irrespective of said determination result.

(Supplementary note 23) An execution control program executed on a multiprocessor system comprising one or a plurality of main processors and a plurality of sub-processors, which causes an execution control circuit which conducts execution control of each said sub-processors to execute:

a function of a determination circuit of said execution control circuit to determine whether or not a status notification from each said sub-processors has one-to-one dependency with a processing command to be issued next on an operation sequence and is to be processed at a high speed;

a function of a status accelerator of said execution control circuit to issue a corresponding processing activation command when the status notification is to be processed at a high speed; and a function of a status FIFO control unit of said execution control circuit to process said status notification by using an execution control processor for execution control processing of each said sub-processors.

(Supplementary note 24) The execution control program according to supplementary note 23, which causes said status accelerator to execute the function of issuing a corresponding processing activation command by table look-up when the status notification is to be processed at a high speed.

(Supplementary note 25) The execution control program according to supplementary note 23 or supplementary note 24, which causes a command arbitration circuit of said execution control circuit to execute the function of arbitrating accesses from said execution control processor and said status accelerator.

(Supplementary note 26) The execution control program according to any one of supplementary note 23 through supplementary note 25, wherein said status accelerator comprises a command table which stores a sub-processor ID and a processing ID of a corresponding processing command in pairs, and a command output controller for issuing a corresponding processing command to each said sub-processors, wherein said execution control program causes said command output controller to execute a function of, with all or a part of data transferred from said determination circuit as an address, reading a stored processing command from said command table and to a sub-processor having a read sub-processor ID, issuing a processing activation command so as to include a processing ID read together.

(Supplementary note 27) The execution control program according to any one of supplementary note 23 through supplementary note 26, wherein a bit region for determination is provided in a format of status data for said status notification, and which causes said determination circuit to execute the functions of:

making determination by using said bit region for determination, and transferring all or a part of said status data to said status accelerator when the determination is made that the status notification has the one-to-one dependency and is to be processed at a high speed and otherwise transferring said status data to said status FIFO control unit.

(Supplementary note 28) The execution control program according to any one of supplementary note 23 through supplementary note 26, which causes said determination circuit to execute the functions of:

when accessing by using input status data, if a processing command having the one-to-one dependency exists, realizing determination by outputting an address of said command table by means of a content addressable memory, and transferring an address to be output to said status accelerator when the status data hits in said content addressable memory and transferring input said status data to said status FIFO control unit when the data fails to hit.

(Supplementary note 29) The execution control program according to any one of supplementary note 23 through supplementary note 28, which causes said determination circuit to execute the function of transferring all the status data to said status FIFO control unit according to a value of a control register which can be set by said main processor or said execution control processor irrespective of said determination result.

Incorporation By Reference

This application is based upon and claims the benefit of priority from Japanese patent application No. 2010-120241, filed on May 26, 2010, the disclosure of which is incorporated herein in its entirety by reference.

What is claimed is:

1. A multiprocessor system comprising:
one or a plurality of main processors and a plurality of sub-processors which execute a command issued; and
an execution control circuit which conducts execution control of each said plurality of sub-processors,
wherein said execution control circuit comprising
a control bus output unit which outputs said command to each any of said plurality of sub-processors,
a status bus input unit which inputs a status notification indicative of a processing state of a command issued to each said plurality of sub-processors from each said plurality of sub-processors,
a determination circuit which determines whether or not said status notification that is input from a sub-processor to which a first command is issued among said plurality of sub-processors and that is indicative of a processing state of said first command has one-to-one dependency with a second command to be issued next on an operation sequence,
a status accelerator which issues said second command to said control bus output unit when the state notification is determined to have said dependency,
a status FIFO control unit which stores said status notification when determination is made that said dependency fails to exist, and
an execution control processor which executes predetermined analysis by using said status notification stored to issue a third command to said control bus output unit.

2. The multiprocessor system according to claim 1, wherein said status accelerator issues a corresponding processing activation command by table look-up when the status notification is to be processed at a high speed.

3. The multiprocessor system according to claim 1, wherein said execution control circuit comprises a command arbitration circuit which arbitrates accesses from said execution control processor and said status accelerator.

4. The multiprocessor system according to claim 1, wherein said status accelerator comprises
a command table which stores a sub-processor ID and a processing ID of a corresponding processing command in pairs, and
a command output controller for issuing a corresponding processing command to said sub-processor, wherein said command output controller
with all or a part of data transferred from said determination circuit as an address, reads a stored processing command from said command table and to a sub-processor having a read sub-processor ID, issues a processing activation command so as to include a processing ID read together.

5. The multiprocessor system according to of claim 1, wherein
a bit region for determination is provided in a format of status data for said status notification, and
said determination circuit comprises
a comparison determination circuit which executes determination by using said bit region for determination, and
a transfer selection unit which transfers all or a part of said status data to said status accelerator when the determination is made that the status notification has the one-to-one dependency and is to be processed at a high speed and otherwise transfers said status data to said status FIFO control unit.

6. The multiprocessor system according to claim 1, wherein said determination circuit comprises
a content addressable memory which when accessed by using input status data, if a processing command having the one-to-one dependency exists, realizes determination by outputting an address of said command table, and
a transfer selection unit which transfers an address to be output to said status accelerator when the status data hits in said content addressable memory and transfers input said status data to said status FIFO control unit when the data fails to hit.

7. The multiprocessor system according to claim 6, wherein said content addressable memory comprises
a hash value calculation circuit for status data,
a hash table which stores, with a hash value calculated from status data having the one-to-one dependency as an address, the status data in question as data, and
an address counter for realizing determination by a minimum number of accesses when a plurality of pieces of status data having the same hash value exist.

8. The multiprocessor system according to claim 1, wherein said execution control circuit comprises
a command FIFO control unit for setting an operation sequence and inputting a command from the main processor for the communication with the main processor,
an interrupt FIFO control unit for interrupt notification to the main processor such as processing sequence completion,
a FIFO base address setting register and a FIFO number of stages setting register which share entities of said status FIFO control unit, said command FIFO control unit and said interrupt FIFO control unit in a memory on the same address space to make the number of stages of each FIFO be variable, and
an address conversion unit which when an access to each FIFO control unit occurs, converts the access address into an actual memory address by using values of two said FIFO setting registers.

9. A sub-processor execution controlling method in a multiprocessor system comprising one or a plurality of main processors and a plurality of sub-processors which execute a command issued, wherein
an execution control circuit which conducts execution control of each said plurality of sub-processors is provided,
a determination circuit of said execution control circuit determines whether or not a status notification that is input from a sub-processor to which a first command is issued among said plurality of sub-processors and that is indicative of a processing state of said first command has one-to-one dependency with a second command to be issued next on an operation sequence,
a status accelerator of said execution control circuit issues said second command when the status notification is determined to have said dependency,
a status FIFO control unit of said execution control circuit stores said status notification when determination is made that said dependency fails to exist, and,
an execution control processor of said execution control circuit executes predetermined analysis by using said status notification stored to issue a third command.

10. A computer-readable medium storing an execution control program executed on a multiprocessor system comprising one or a plurality of main processors and a plurality of sub-processors which execute a command issued, wherein said execution control program causes an execution control circuit which conducts execution control of each said sub-processors to execute:

a function of a determination circuit of said execution control circuit to determine whether or not a status notification that is input from a sub-processor to which a first command is issued among said plurality of sub-processors and that is indicative of a processing state of said first command has one-to-one dependency with a second command to be issued next on an operation sequence;

a function of a status accelerator of said execution control circuit to issue said second command when the status notification is determined to have said dependency;

a function of a status FIFO control unit of said execution control circuit to store said status notification when determination is made that said dependency fails to exist, and, a function of an execution control processor of said execution control circuit to execute predetermined analysis by using said status notification stored to issue a third command.

11. The multiprocessor system according to claim 1, wherein said predetermination includes analysis of determination of processed data, a processing state of said command of each said plurality of sub-processors, and dependency between processing by said command and data.

* * * * *